US011822584B2

(12) United States Patent
Setlur et al.

(10) Patent No.: US 11,822,584 B2
(45) Date of Patent: *Nov. 21, 2023

(54) INTERPRETING VAGUE INTENT MODIFIERS IN VISUAL ANALYSIS USING WORD CO-OCCURRENCE AND SENTIMENT ANALYSIS

(71) Applicant: Tableau Software, LLC, Seattle, WA (US)

(72) Inventors: Vidya Raghavan Setlur, Portola Valley, CA (US); Arathi Sripriya Kumar, Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/730,134

(22) Filed: Apr. 26, 2022

(65) Prior Publication Data
US 2022/0253465 A1    Aug. 11, 2022

Related U.S. Application Data

(63) Continuation of application No. 17/138,719, filed on Dec. 30, 2020, now Pat. No. 11,314,786.

(51) Int. Cl.
*G06F 16/28* (2019.01)
*G06F 16/242* (2019.01)
(Continued)

(52) U.S. Cl.
CPC .......... *G06F 16/287* (2019.01); *G06F 3/0484* (2013.01); *G06F 16/243* (2019.01);
(Continued)

(58) Field of Classification Search
CPC .. G06F 16/287; G06F 3/0484; G06F 16/2425; G06F 16/243; G06F 16/24575;
(Continued)

(56) References Cited

U.S. PATENT DOCUMENTS

| 2012/0158765 | A1* | 6/2012 | Kumar | ................ G06F 16/3325 |
| | | | | 707/766 |
| 2018/0336278 | A1* | 11/2018 | Agarwal | ................ G06F 16/35 |

OTHER PUBLICATIONS

Setlur, Notice of Allowance, U.S. Appl. No. 17/138,719, dated Dec. 30, 2021, 18 pgs.

* cited by examiner

*Primary Examiner* — Cam Y T Truong
(74) *Attorney, Agent, or Firm* — Morgan, Lewis & Bockius LLP

(57) ABSTRACT

A method generates data visualizations. A device receives a first user input to specify a natural language command directed to a data source. The natural language command includes a first keyword that is a gradable adjective that modifies a second keyword in the natural language command. The device identifies a numerical data field, from the data source, whose field name co-occurs with the first keyword in natural language utterances in a predefined stored corpus of natural language utterances, based on quantifying co-occurrence using a co-occurrence metric. The device computes a numerical range for values of the numerical data field based on correlation of sentiment polarity of the first keyword and the field name of the numerical data field. The device then generates a data visualization for the data source, based on filtering rows of data from the data source according to the numerical range for the numerical data field.

18 Claims, 39 Drawing Sheets

(51) Int. Cl.
*G06F 16/2457* (2019.01)
*G06F 40/40* (2020.01)
*G06F 3/0484* (2022.01)

(52) U.S. Cl.
CPC .... *G06F 16/2425* (2019.01); *G06F 16/24575* (2019.01); *G06F 40/40* (2020.01)

(58) Field of Classification Search
CPC ........ G06F 40/35; G06F 40/40; G06F 40/268; G06F 40/279; G06F 40/284; G06F 40/30; G06T 11/206
See application file for complete search history.

818 — Compute either (i) the Top N values of the numerical data field in the range from med + MAD to max, or (ii) the Bottom N values of the numerical data field in the range from min to abs(med - MAD). The values med, MAD, min, and max are the median, median absolute deviation, minimum, and maximum values of the numerical data field.

Figure 8C

820 — When semantic polarity of the first keyword is positively correlated with semantic polarity of field name of a first numerical data field, compute the Top N values for the first numerical data field.

822 — When semantic polarity of the first keyword is negatively correlated with semantic polarity of the field name of the first numerical data field, compute the Bottom N values for the first numerical data field.

Figure 8D

824 — Determine a default range for values of the numerical data field based on domain-specific information.

Figure 8E

826 — Display interactive text to show a provenance of interpretation of the first keyword.

Figure 8F

828 — Display one or more user interface widgets to show, repair, and/or refine the numerical range.

Figure 8G

830 — Display the sentiment polarities of the first keyword and the field name of the numerical data field using one or more color encodings.

Figure 8H

832 — Select a numerical data field from a plurality of numerical data fields for the data source based on analyzing co-occurrence between all n-gram combinations of the first keyword and field names of the plurality of numerical data fields, in natural language utterances.

Figure 8I

834 — Select a first numerical data field from a plurality of numerical data fields for the data source when the first numerical data field has a field name with a non-zero Pointwise Mutual Information Measure (PMI) score indicating presence of a co-occurrence with the first keyword.

Figure 8J

INTERPRETING VAGUE INTENT MODIFIERS IN VISUAL ANALYSIS USING WORD CO-OCCURRENCE AND SENTIMENT ANALYSIS

RELATED APPLICATIONS

This application is a continuation of U.S. patent application Ser. No. 17/138,719, filed Dec. 30, 2020, entitled "Interpreting Vague Intent Modifiers in Visual Analysis Using Word Co-occurrence and Sentiment Analysis," which is incorporated by reference herein in its entirety.

This application is related to U.S. patent application Ser. No. 16/601,413, filed Oct. 14, 2019, entitled "Determining Ranges for Vague Modifiers in Natural Language Commands," now U.S. Pat. No. 11,042,558, which is incorporated by reference herein in its entirety.

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable users to understand data sets visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface. Most systems return only very basic interactive visualizations in response to queries, and others require expert modeling to create effective queries. Other systems require simple closed-ended questions, and then are only capable of returning a single text answer or a static visualization.

Natural language has garnered interest as a useful modality for creating and interacting with visualizations. Natural language interaction techniques offer the promise of easy, intuitive engagement with data even for non-experts by enabling users to express their analytical goals as natural language utterances. Natural language interaction is effective when it supports questions pertaining to a user's information needs. However, supporting natural language interactions with visual analytical systems is often challenging. For example, users tend to provide utterances that are linguistically colloquial, underspecified, or ambiguous, while the visual analytics system has more complicated nuances of realizing these utterances against the underlying data and analytical functions. Users also expect high precision and recall from such natural language interfaces. In this respect, many natural language interfaces fail to accurately determine a user's information needs.

Furthermore, natural language interaction with data visualization tools often involves the use of vague and rather subjective modifiers in utterances such as "show me the sectors that are performing" and "where is a good neighborhood to buy a house?". Interpreting these modifiers is often difficult for conventional data visualization tools, because the modifiers lack clear semantics and are in part defined by context and personal user preferences.

SUMMARY

There is a need for improved systems and methods that support natural language interactions with visual analytical systems. The present disclosure describes a data visualization application that employs a set of techniques for handling vague modifiers in natural language commands to generate useful data visualizations. The data visualization application uses interface defaults to generate useful data visualizations. Some implementations employ word co-occurrence and sentiment analysis to determine which data fields and filter ranges to associate with vague and/or subjective predicates. Some implementations show provenance results as interactive text that can be repaired and/or refined by a user.

In accordance with some implementations, a method executes at a computing device having a display, one or more processors, and memory storing one or more programs configured for execution by the one or more processors. The computing device receives a first user input to specify a natural language command directed to a data source. The natural language command includes a request for information about the data source. The computing device identifies, in the natural language command, a first keyword that is a gradable adjective that modifies a second keyword in the natural language command. The computing device also identifies a numerical data field, from the data source, whose field name co-occurs with the first keyword in natural language utterances in a predefined stored corpus of natural language utterances, based on quantifying co-occurrence using a co-occurrence metric. The computing device computes a numerical range for values of the numerical data field based on correlation of sentiment polarity of the first keyword and the field name of the numerical data field. The computing device also generates and displays a data visualization, including a plurality of visual marks representing data retrieved from the data source, based on filtering rows of data from the data source according to the numerical range for the numerical data field.

In some implementations, computing the numerical range for values of the numerical data field includes computing (i) the Top N values of the numerical data field in the range from med+MAD to max, or (ii) the Bottom N values of the numerical data field in the range from min to abs(med−MAD). The elements "med," "MAD," "min," and "max" are the median, median absolute deviation, minimum, and maximum values of the numerical data field.

In some implementations, computing the numerical range for values of the numerical data field includes: (i) when the semantic polarity of the first keyword is positively correlated with the semantic polarity of field name of the numerical data field, computing the Top N values for the first numerical data field; and (ii) when the semantic polarity of the first keyword is negatively correlated with the semantic polarity of the field name of the numerical data field, computing the Bottom N values for the numerical data field.

In some implementations, the computing device determines a default range for values of the numerical data field based on domain-specific information.

In some implementations, the computing device displays interactive text to show a provenance of interpretation of the first keyword.

In some implementations, the computing device displays one or more user interface widgets to show, repair, and/or refine the numerical range.

In some implementations, the computing device displays the sentiment polarities of the first keyword and the field name of the numerical data field using one or more color encodings.

In some implementations, the co-occurrence metric measures co-occurrence between all n-gram combinations of the first keyword and field names of the plurality of numerical data fields from the data source.

In some implementations, the co-occurrence metric computes a Pointwise Mutual Information Measure (PMI) score for each data field name of a respective numerical data field from the data source, measuring coupling of the respective data field name to the first keyword.

In some implementations, generating the data visualization includes generating a visual specification that specifies the data source, a plurality of visual variables, and a plurality of data fields from the data source. Each of the visual variables is associated with a respective one or more data fields of the plurality of data fields and each of the data fields is identified as either a dimension or a measure. The first keyword corresponds to one or more first data fields of the plurality of data fields. In some instances, one or more visual variables are associated with the one or more first data fields according to the numerical range for values of the numerical data field.

Typically, an electronic device includes one or more processors, memory, a display, and one or more programs stored in the memory. The programs are configured for execution by the one or more processors and are configured to perform any of the methods described herein.

In some implementations, a non-transitory computer-readable storage medium stores one or more programs configured for execution by a computing device having one or more processors, memory, and a display. The one or more programs are configured to perform any of the methods described herein.

Thus methods, systems, and graphical user interfaces are disclosed that allow users to efficiently generate and modify data displayed within a data visualization application by using natural language commands.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 8A-8K provide a flow diagram of a method for generating data visualizations according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The various methods and devices disclosed in the present specification improve the effectiveness of natural language interfaces on data visualization platforms by using interface defaults when handling vague (e.g., ambiguous) modifiers in natural language commands directed to a data source. The data visualization platform automatically generates and displays a data visualization (or an updated data visualization) of retrieved data sets in response to the natural language input. The data visualization uses data visualization defaults (e.g., predetermined defaults) in displaying the visual information to the user.

Figure 1:
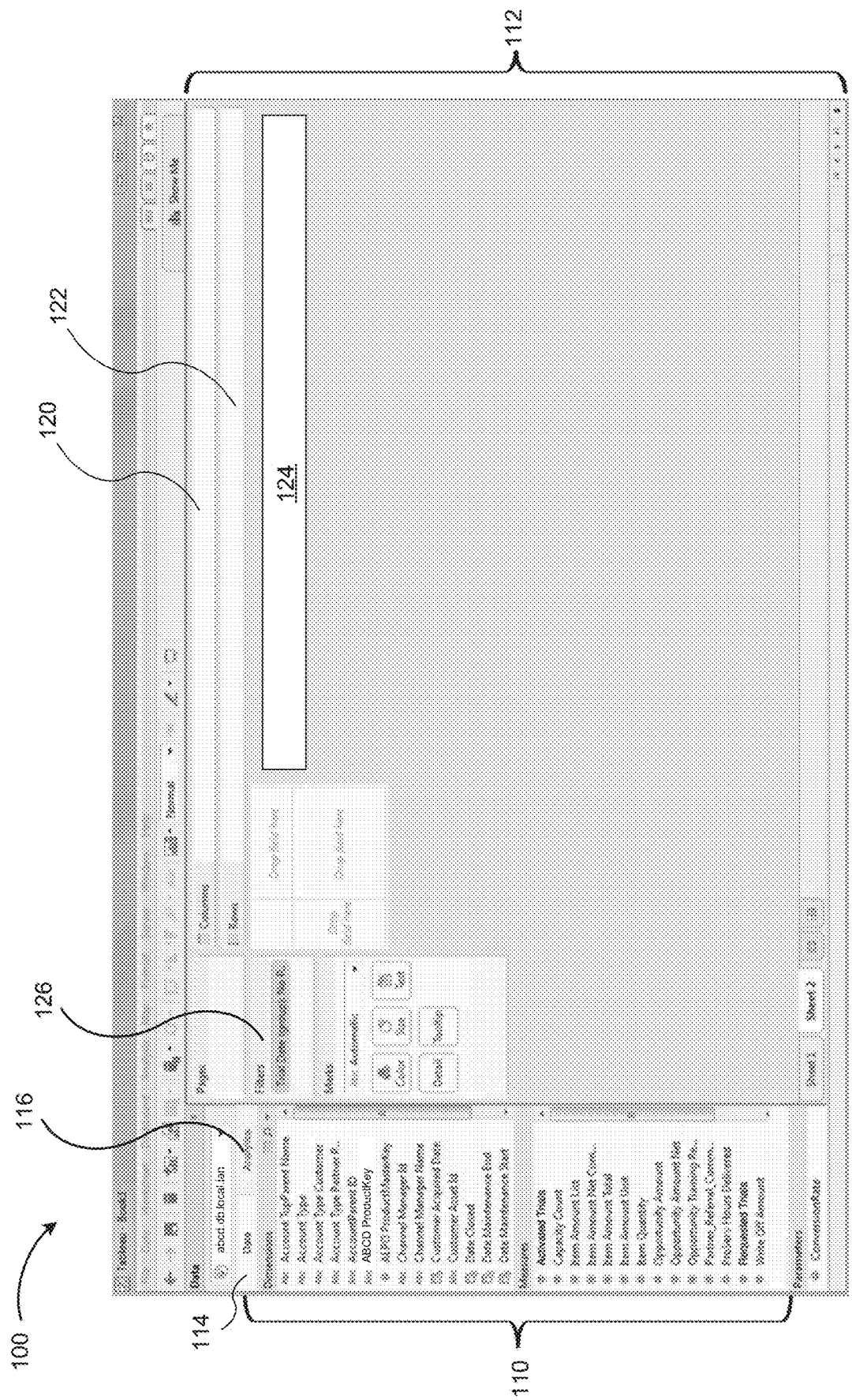
FIG. 1 illustrates a graphical user interface used in some implementations.

FIG. 1 illustrates a graphical user interface 100 for interactive data analysis in a data visualization application. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization or "data viz"). Because no data elements have been selected yet, the space initially has no visual graphic. In some implementations, the data visualization region 112 has multiple layers that are referred to as sheets. In some implementations, the data visualization region 112 includes a region 126 for data visualization filters. In some implementations, the filter region 126 is used both for receiving user input to specify filters as well as displaying what data fields have been selected for use in filters.

In some implementations, the graphical user interface 100 also includes a natural language input box 124 (also referred to as a command box) for receiving natural language commands. A user may interact with the command box to provide commands. For example, the user may provide a natural language command by typing the command in the natural language input box 124. In addition, the user may indirectly interact with the command box by speaking into a microphone 220 to provide commands.

In some instances, a user initially associates data elements with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and/or on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

For example, a user may input a natural language command that requests information related to a data source and/or a currently displayed data visualization. In many instances, natural language commands include adjectives, such as "affordable" or "tall." Such adjectives (or "modifiers") can be challenging to handle when processing natural language commands. Some properties of adjectives that pose challenges in processing natural language commands include: (i) gradedness, (ii) antonyms versus "not"-adjectives, (iii) components, and (iv) subjectivity.

Referring to graded adjectives (e.g., gradable adjectives), many adjectives are or can be graded, meaning that they can be interpreted on a scale (e.g., from more expensive to less expensive). This interpretation is context-specific, sensitive to the distribution of data values, and can also depend on a relative value and/or an absolute value. For example, Kyle has an expensive car that is a BMW. However, Kyle's car is not expensive for a BMW since it is the least expensive BMW model available.

Referring to antonyms versus "not"-adjectives, an antonym can be interpreted differently from a not-adjective. For example, items labeled as "cheap" may be different than those labeled as "not expensive." For instance, a $15 bottle of wine may be labeled as "not expensive" or "inexpensive" but may not be included in the "cheap" section of the wine store. The "cheap" section of the wine store may only include wine bottles that are under $8.

Referring to adjectives with different components, some adjectives are associated with multiple distinct attributes, and the relevant attribute may depend on context or be unclear. For example, the adjective "cheap" can be associated with either price or quality (or both), whereas an adjective like "tall" is associated solely with height.

Referring to subjectivity, some adjectives are more subjective than others. For example, when a data source containing information about professional athletes has been selected, a user may request, "show me tall male athletes." In this case, "tall" is a subjective adjective. A person who is 5 feet 5 inches in height may consider someone who is 6 feet or taller as "tall," but a person who is 6 feet in height may consider 6 feet and 6 inches or taller as "tall." Additionally, subjective adjectives can be interpreted differently based on context. For example, most professional basketball players are well over 6 feet tall, so an athlete whose height is 6 feet 4 inches may be considered "tall" in general but not a "tall" basketball player. Conversely, an average jockey is approximately 5 feet 6 inches in height. Thus, even though an average male (in 2019) is 5 feet 9 inches in height, a jockey who is 5 feet 9 inches in height may be considered tall and a professional basketball player who is 5 feet 9 inches in height would probably be considered short.

Due to the many ways that adjectives can be interpreted based on context and/or user intent, a data visualization application can utilize aspects of the data source and/or a currently displayed data visualization to determine context and/or user intent when handling natural language commands that include such adjectives (e.g., modifiers). In some implementations, the data visualization application includes interface defaults for handling natural language commands that include vague or subjective modifiers so that generated data visualizations display information in a manner that is in line with most user's expectations (e.g., does not deviate from the user intent or the context of the information being analyzed).

Figure 2A:
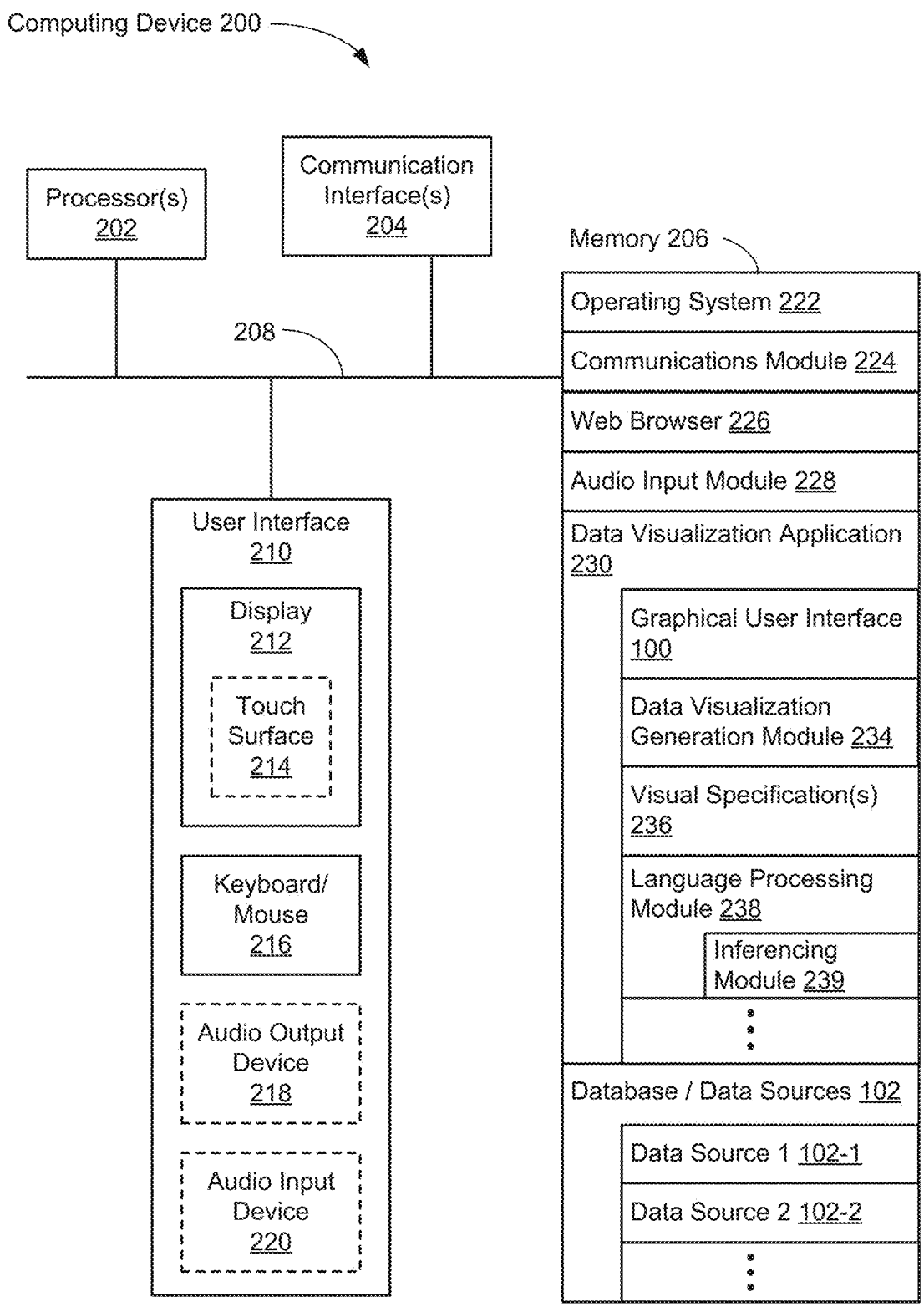
FIG. 2A is a block diagram illustrating a computing device according to some implementations.

FIG. 2A is a block diagram of a computing device 200 that can execute a data visualization application 230 or a data visualization web application to display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communications interfaces 204, memory 206, and one or more communication buses 208 for interconnecting these components. In some implementations, the communication buses 208 include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively, or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone 220 and voice recognition software to supplement or replace the keyboard. An audio input device 220 (e.g., a microphone) captures audio (e.g., speech from a user).

The memory 206 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 206 includes one or more storage devices remotely located from the processors 202. The memory 206, or alternatively the non-volatile memory devices within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication network interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. The data visualization application 230 includes a graphical user interface 100 (e.g., as illustrated in FIG. 1) for a user to construct visual graphics. For example, a user selects one or more data sources 102 (which may be stored on the computing device 200 or stored remotely), selects data fields from the data sources, and uses the selected fields to define a visual graphic; and
- zero or more databases or data sources 102 (e.g., a first data source 102-1 and a second data source 102-2), which are used by the data visualization application 230. In some implementations, the data sources are stored as spreadsheet files, CSV files, text files, JSON files, XML files, or flat files, or stored in a relational database.

In some implementations, the data visualization application 230 includes a data visualization generation module 234, which takes user input (e.g., a visual specification 236), and generates a corresponding visual graphic. The data visualization application 230 then displays the generated visual graphic in the graphical user interface 100. In some implementations, the data visualization application 230 executes as a standalone application (e.g., a desktop application). In some implementations, the data visualization application 230 executes within the web browser 226 or another application using web pages provided by a web server (e.g., a server-based application).

In some implementations, the information the user provides (e.g., user input) is stored as a visual specification 236.

In some implementations, a visual specification 236 includes previous natural language commands received from a user or properties specified by the user through natural language commands. In some implementations, a visual specification 236 includes interface defaults for displaying information in a data visualization.

In some implementations, the data visualization application 230 includes a language processing module 238 for processing (e.g., interpreting) commands provided by a user of the computing device. In some implementations, the commands are natural language commands (e.g., captured by the audio input device 220 or input via the touch surface 214 or the one or more input buttons such as buttons on a keyboard/mouse 216). In some implementations, the language processing module 238 includes sub-modules, such as an inferencing module 239. An inferencing module 239 is used to resolve underspecified (e.g., omitted information) or ambiguous (e.g., vague) natural language commands (e.g., expressions or utterances) directed to databases or data sources 102. As will be explained in further detail, the inferencing module 239 includes algorithms for inferring reasonable defaults for natural language commands that include vague (e.g., ambiguous) concepts such as "high," "not expensive," and "popular," and/or vague modifiers, such as "safer," "dangerous," "booming," and "struggling."

In some implementations, the memory 206 stores metrics and/or scores determined by the language processing module 238. In addition, the memory 206 may store thresholds and other criteria, which are compared against the metrics and/or scores determined by the language processing module 238. For example, the language processing module 238 may determine a relatedness metric (discussed in detail below) for an analytic word/phrase of a received command. Then, the language processing module 238 may compare the relatedness metric against a threshold stored in the memory 206.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise rearranged in various implementations. In some implementations, the memory 206 stores a subset of the modules and data structures identified above. Furthermore, the memory 206 may store additional modules or data structures not described above.

Although FIG. 2A shows a computing device 200, FIG. 2A is intended more as a functional description of the various features that may be present rather than as a structural schematic of the implementations described herein. In practice, and as recognized by those of ordinary skill in the art, items shown separately could be combined and some items could be separated.

Figure 2B:
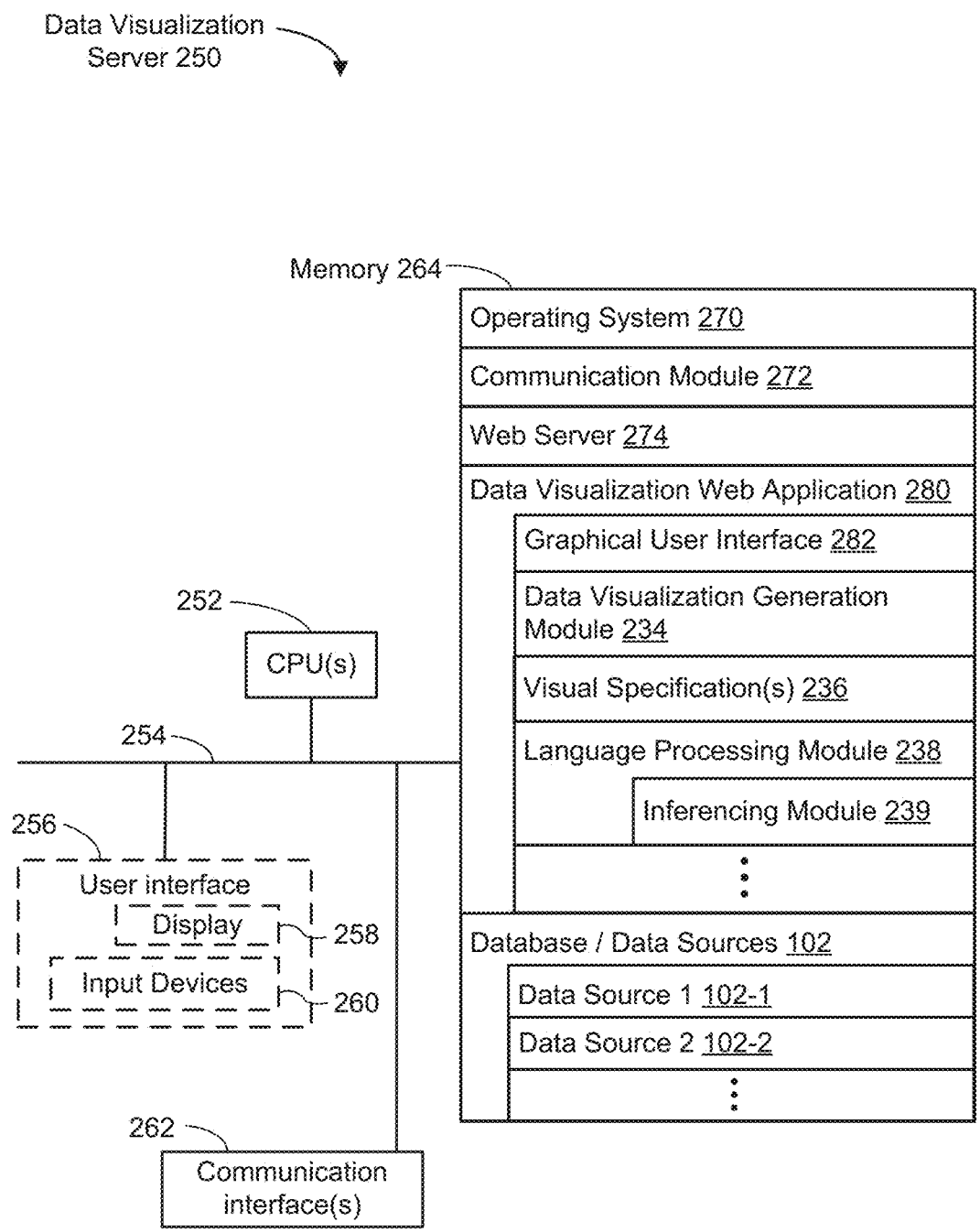
FIG. 2B is a block diagram illustrating a data visualization server according to some implementations.

FIG. 2B is a block diagram illustrating a data visualization server 250 according to some implementations. A data visualization server 250 may host one or more databases that include data sources 102 or may provide various executable applications or modules. A server 250 typically includes one or more processing units/cores (CPUs) 252, one or more communication network interfaces 262, memory 264, and one or more communication buses 254 for interconnecting these components. In some implementations, the server 250 includes a user interface 256, which includes a display 258 and one or more input devices 260, such as a keyboard and a mouse. In some implementations, the communication buses 254 include circuitry (sometimes called a chipset) that interconnects and controls communications between system components.

In some implementations, the memory 264 includes high-speed random-access memory, such as DRAM, SRAM, DDR RAM, or other random-access solid-state memory devices, and may include non-volatile memory, such as one or more magnetic disk storage devices, optical disk storage devices, flash memory devices, or other non-volatile solid-state storage devices. In some implementations, the memory 264 includes one or more storage devices remotely located from the CPUs 250. The memory 264, or alternatively the non-volatile memory devices within the memory 264, comprises a non-transitory computer-readable storage medium.

In some implementations, the memory 264, or the computer-readable storage medium of the memory 264, stores the following programs, modules, and data structures, or a subset thereof:
- an operating system 270, which includes procedures for handling various basic system services and for performing hardware dependent tasks;
- a network communication module 272, which is used for connecting the server 250 to other computers via the one or more communication network interfaces 262 (wired or wireless) and one or more communication networks, such as the Internet, other wide area networks, local area networks, metropolitan area networks, and so on;
- a web server 274 (such as an HTTP server), which receives web requests from users and responds by providing responsive web pages or other resources;
- a data visualization web application 280, which may be a web application that is downloaded and executed by a web browser on a user's computing device 200 (e.g., downloading individual web pages as needed). In general, a data visualization application web has the same functionality as a desktop data visualization application, but provides the flexibility of access from any device at any location with network connectivity, and does not require installation and maintenance. In some implementations, the data visualization web application 280 includes various software modules to perform certain tasks. In some implementations, the data visualization web application includes a graphical user interface 282, which provides the user interface for all aspects of the data visualization web application 280; and
- a database that stores zero or more data sources 102, as described above for a client device 200.

In some implementations, the data visualization web application 280 includes a data visualization generation module 234 and/or a language processing module 238 (including an inferencing module 239), as described above for a client device 200. In some implementations, the data visualization web application 280 stores visual specifications 236, which are used to build data visualizations.

Although FIG. 2B shows a data visualization server 250, FIG. 2B is intended more as a functional description of the various features that may be present rather than as a structural schematic of the implementations described herein. In practice, and as recognized by those of ordinary skill in the art, items shown separately could be combined and some items could be separated.

Understanding user intent in a query has been recognized as an important aspect of any natural language (NL) interaction system. Search queries typically consist of keywords and terms called modifiers that imply a diverse set of search intents. While basic keyword matches from users' search queries might elicit a reasonable set of results, interpreting modifiers provides a better understanding of the semantics in the queries. For example, for the query "find me the best coffee shops near palo alto," the modifier "near palo alto" specifies an intent of finding coffee shops in the vicinity of Palo Alto, California (i.e., a location), whereas the modifier "best" implies quality.

Natural Language interfaces for visual analysis tools have garnered interest in supporting expressive ways for users to interact with their data and see results expressed as visualizations. Users often employ vague language while formulating natural language queries when exploring data such as "which country has a high number of gold medals?" or "what time of the day do more bird strikes occur?" Often vagueness is used as a means to be less precise to avoid errors when interacting with such systems or simply because there is no well-understood concrete way to express the concept.

Modifiers can be vague or imprecise. Furthermore, different users may have different ideas of what a vague modifier implies, and their meaning often depends on context. Vague modifiers range from more concrete modifiers that include superlative modifiers on numerical quantities (e.g., "tallest", "cheapest", "most expensive") to graded modifiers on numerical quantities (e.g., "cheap", "low", "high", "expensive") to more fuzzy modifiers that are subjective, often based on context (e.g., "safe", "best", "healthy"), where interpretation often depends on context.

A query elicitation task based on responses from 75 participants and 578 different natural language queries found a prevalence of vague modifiers in natural language for visual analytics. For example, users preferred to use modifiers, such as most, highest, more, top, last, biggest, best, lowest, greater, least, largest, new, worst, long, far, expensive, high, bigger, well, and higher.

Some implementations interpret simple vague modifiers comprising singular/plural superlatives and numerical graded adjectives (e.g., based on shape of data distributions). However, users also employ less concrete and often subjective modifiers such as "best," "safe," and "worse" in utterances. Such modifiers typically have blurred boundaries that do not allow for a sharp distinction between the entities that fall within their extension and those that do not. As described herein, some implementations interpret such fuzzy, and/or subjective modifiers for natural language interfaces to precisely determine the extensions of such concepts and mapping intent to the analytical functions and data provided in the visual analysis systems.

Some implementations employ a system to explore reasonable interpretations and defaults for such subjective vague modifiers in natural language interfaces for visual analysis. In some implementations, the system uses an algorithm that identifies numerical attributes that can be associated with a given modifier using word co-occurrence. Sentiment analysis determines the filter ranges applied to the attributes for interpreting the modifier. In some implementations, similar polarities result in associating the Top N data values for an attribute with the modifier, while diverging polarities are mapped to the Bottom N data values.

Figure 3A:
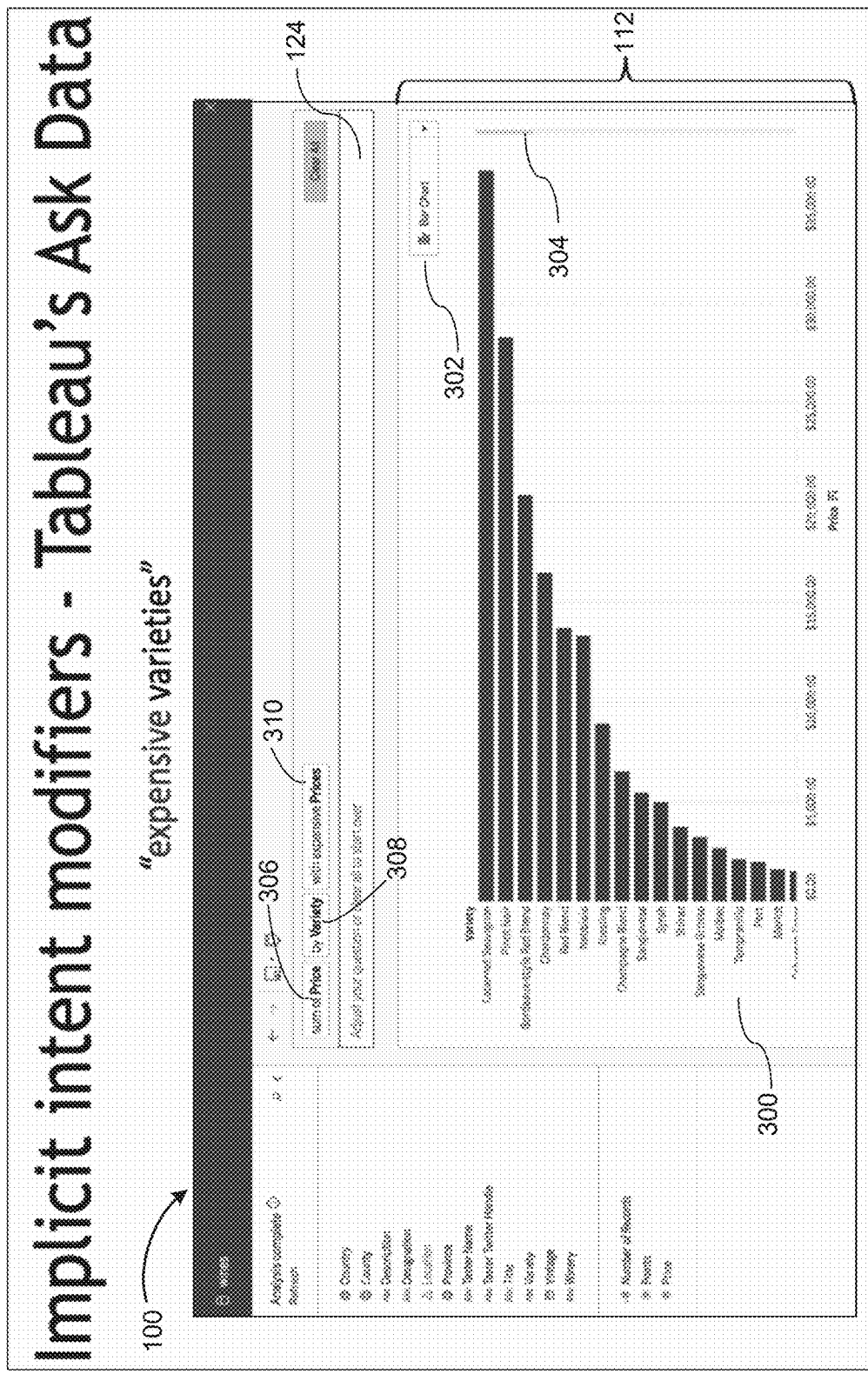
FIGS. 3A-3C provide examples of data visualizations in accordance with some implementations.

FIG. 3A provides an example of a data visualization in accordance with some implementations. FIG. 3A shows an example graphical user interface 100 for a data visualization application 230. As described above with respect to FIG. 1, the graphical user interface 100 includes a data visualization region 112 and a natural language input box 124 (e.g., a command box). The data visualization region 112 displays a data visualization 300 and includes an interactive user affordance 302 that displays the type of data visualization ("bar chart") currently being displayed. In some implementations, as shown, the interactive user affordance 302 is a drop down box that allows a user to specify the data visualization type to be displayed in the data visualization region 112. As shown, the data visualization 300 displays information from a data source that includes information on price of wine varieties. The data visualization 300 is a bar chart showing the wine varieties sorted by sum of price, with expensive wines at the top. The scroll bar 304 enables a user to see additional wine varieties. The data visualization 300 may have been generated in response to a user input that is a natural language command (entered via the natural language input box 124 and/or a via a voice command), and/or a user's actions to select data fields to be displayed. For example, a user may have selected "sum of Price" 306 to be plotted "by variety" 308 in a bar chart "with expensive Prices" 310 in order to generate the data visualization 300. Alternatively, the user may provide a natural language command, "expensive varieties." In response to the user input, the data visualization 300 is generated and displayed in the data visualization region 112. In some implementations, the data visualization 300 is generated automatically when the data source is selected. Once a data source is selected, the data visualization application 230 generates a visual specification that specifies the selected data source, a plurality of visual variables, and a plurality of data fields from the data source. Each of the visual variables is associated with a respective one or more of the data fields and each of the data fields is identified as either a dimension or a measure. The visual variables include information that encode how the data visualization will look (e.g., data visualization type, what data points will be displayed or represented as visual marks, the color scheme of visual marks, or emphasizing certain visual marks). A data visualization is generated and displayed based on the visual specification.

In some instances, a user wants to know more information from the data source. For example, a user may ask, "expensive varieties." In this example, "expensive" is a superlative adjective indicating that the user may want to see the wine varieties (for the running example) that have the highest cost. In some implementations, in response to the natural language command, the data visualization application 230 identifies a first keyword (e.g., "varieties") in the natural language command and one or more second keywords (e.g., "expensive") in the natural language command that are adjectives that modify the first keyword. The data visualization then generates a visual specification or modifies an existing visual specification so that the second keyword corresponds to one or more first data fields of the plurality of data fields (e.g., select the "Price" data field). One or more visual variables are associated with the one or more first data fields according to the one or more second keywords (e.g., visual variables associated with filtering or emphasizing/ deemphasizing is associated with a data field corresponding to a number of patients by age so that the age bins that have the greatest number of records are emphasized/highlighted or shown). The data visualization application 230 then generates a data visualization in accordance with (e.g., based on) the visual specification and displays the data visualization in the data visualization region 112.

In some instances, the data visualization application 230 determines user intent based, at least in part, on additional keywords. For example, suppose a user inputs "most expensive." While "most" is a superlative adverb that by definition refers to a single wine, the data visualization application 230 may determine that the user intent may not be to apply a filter. Instead, the data visualization application 230 may determine that the user intent is to identify multiple wine varieties that have the highest cost. The data visualization may highlight the wine varieties that have the highest cost. Additionally, the data visualization application 230 may determine the data visualization type for the data visualization based, at least in part, on the determined user intent. For example, the data visualization application 230 may determine that a bar chart is an appropriate data visualization type because the user has asked for information regarding the number of records by variety. The data visualization type may be one of: a Bar Chart, a Line Chart, a Scatter Plot, a Pie Chart, a Map, or a Text Table.

In some implementations, an initial data visualization (e.g., the data visualization 300) provides a context for the data visualization application 230 to interpret the natural language command and/or to determine the user intent. For example, when a user provides the natural language command "expensive varieties" while an initial data visualization is displayed, the data visualization application 230 may maintain the context of the initial data visualization and choose to highlight or filter the information displayed in the initial data visualization 300 and keep the same data visualization type and color scheme rather show a new data visualization that is a completely different data visualization type or has visual marks (e.g., bars) that have completely different colors.

Figure 3B:
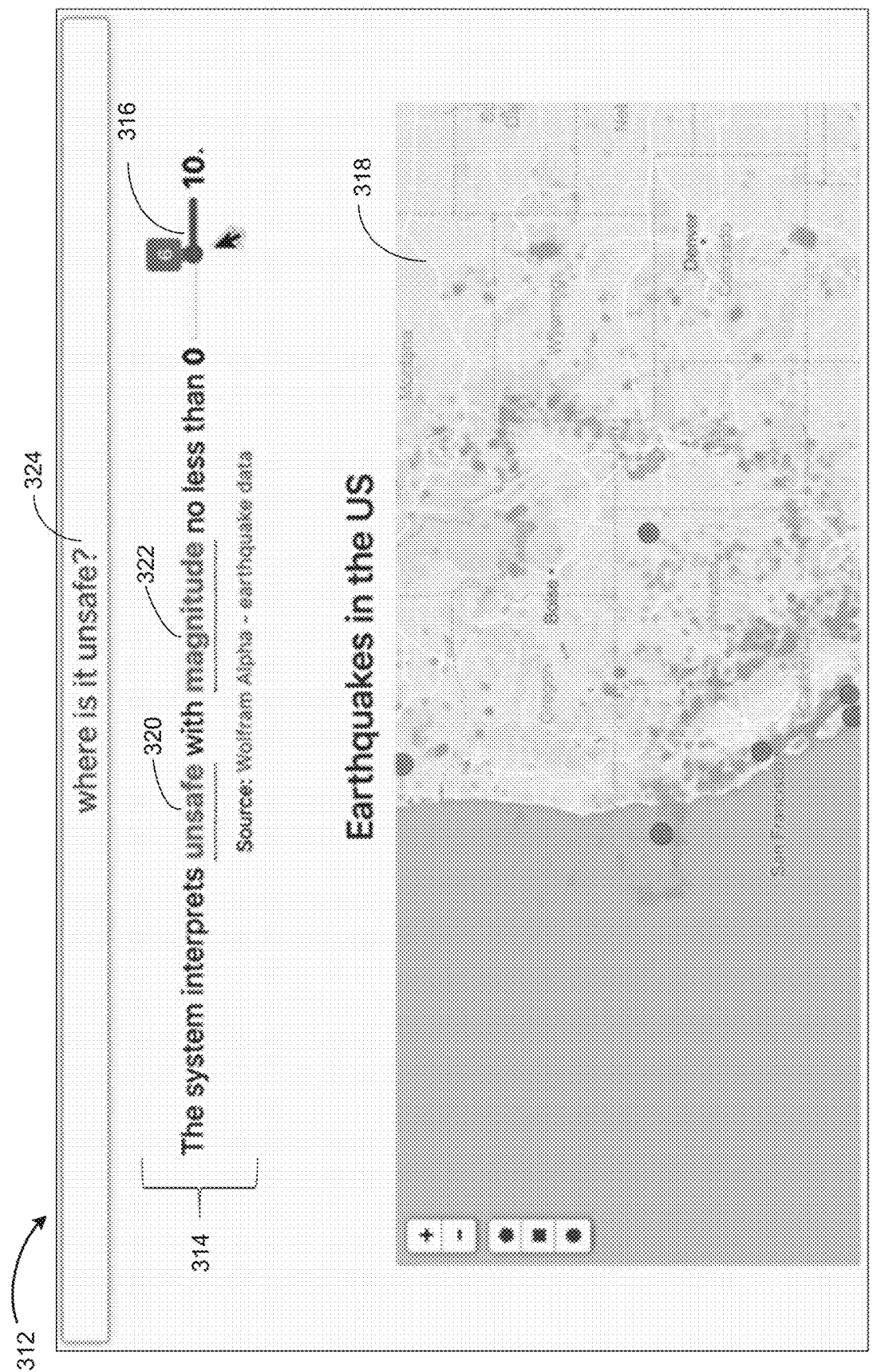

FIG. 3B shows an example that illustrates interpretation of vague intent modifiers using sentiment analysis and word co-occurrence, according to some implementations. FIG. 3B shows a graphical user interface 312 that shows a data visualization 318 that corresponds to a dataset of earthquakes in the United States. Suppose a user inputs a natural language command (e.g., the user types or says) "where is it unsafe?" 324. Some implementations display interactive text 314. Some implementations also show one or more widgets (e.g., a slider widget 316) for the user to adjust ranges for numerical data fields, according to some implementations. For this example, the system identifies the vague modifier "unsafe" 320 that co-occurs with a data field named "magnitude" 322. The system also identifies that the modifier "unsafe" 320 and the data field named "magnitude" 322 have similar negative sentiment polarities. In the example shown, the system color codes the negative sentiments (e.g., using a red color). For this example, the negative sentiment polarities for both the modifier 320 and the data field named "magnitude" are shown in red. In some implementations, because the sentiment polarities are similar (e.g., both have negative sentiment polarities), the system calculates a top N filter, which limits rows of the data source according to data values for the data field. In this example, the system computes a magnitude value of 6 or higher to be applied for the field named "magnitude." In other words, the system determines that "unsafe" and the data field named "magnitude" have similar negative sentiment polarities, and chooses a higher earthquake magnitude range. Some implementations update the data visualization based on the filters. In this example, the data visualization 318 is updated to show earthquakes with magnitude 6 or higher. In some implementations, the system utilizes domain-specific information, such as data provided by WolframAlpha.

Figure 3C:
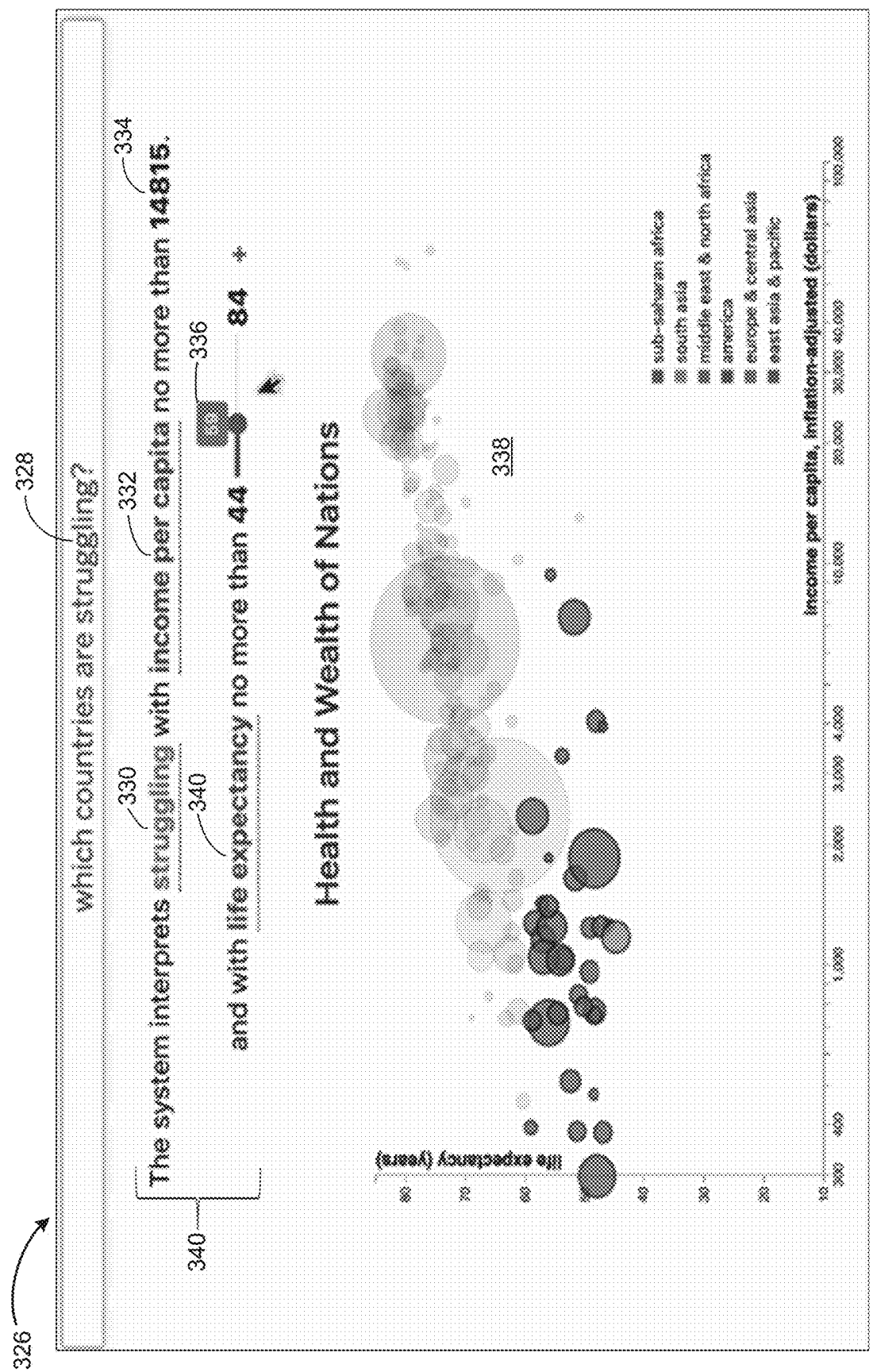

FIG. 3C provides another example that illustrates interpretation of vague intent modifiers using sentiment analysis and word co-occurrence, according to some implementations. FIG. 3C shows a graphical user interface 326 that shows a data visualization 338, which corresponds to a dataset for health and wealth of nations. Suppose a user inputs a natural language command (e.g., the user types or says) "which countries are struggling?" 328. According to some implementations. The system identifies the modifier "struggling" 330 and the fact that the modifier has a negative sentiment (shown in red color), according to some implementations. The system also identifies data fields named "incomePerCapita" 332 and "lifeExpectancy" 340 that co-occur with the modifier "struggling" 330. The system also determines that the two data field names have positive sentiments (shown in blue color). Accordingly, the system determines that the modifier 330 and the data field names 332 and 340 have diverging sentiment polarities, and calculates and applies Bottom N filters for the respective data fields. In the example shown, the system computes and applies lower numerical filter ranges based on the statistical properties of the data to generate and/or update the data visualization 338 (a scatterplot in this example). As in FIG. 3B, some implementations show interactive text 340 to show the provenance of the system's interpretation with clickable portions exposed as widgets (e.g., the widgets 334 and 336) that can be refined by the user. In this way, the system supports identification of vague concepts in visual analysis, according to some implementations.

Some implementations interpret imprecise modifiers and determine reasonable defaults. Some implementations handle numerical vague concepts, such as "cheap" and "high," by inferring a numerical range based on the underlying statistical properties of the data. Some implementations generate visualization responses to singular and plural superlatives and numerical graded adjectives, such as "cheap apartment" and "cheapest apartments," based on the shape of the data distributions. Some implementations handle more fuzzy, subjective modifiers in a visual analysis context, employing word co-occurrence and sentiment analysis to determine the association of the modifiers with relevant data attributes.

Figure 4A:
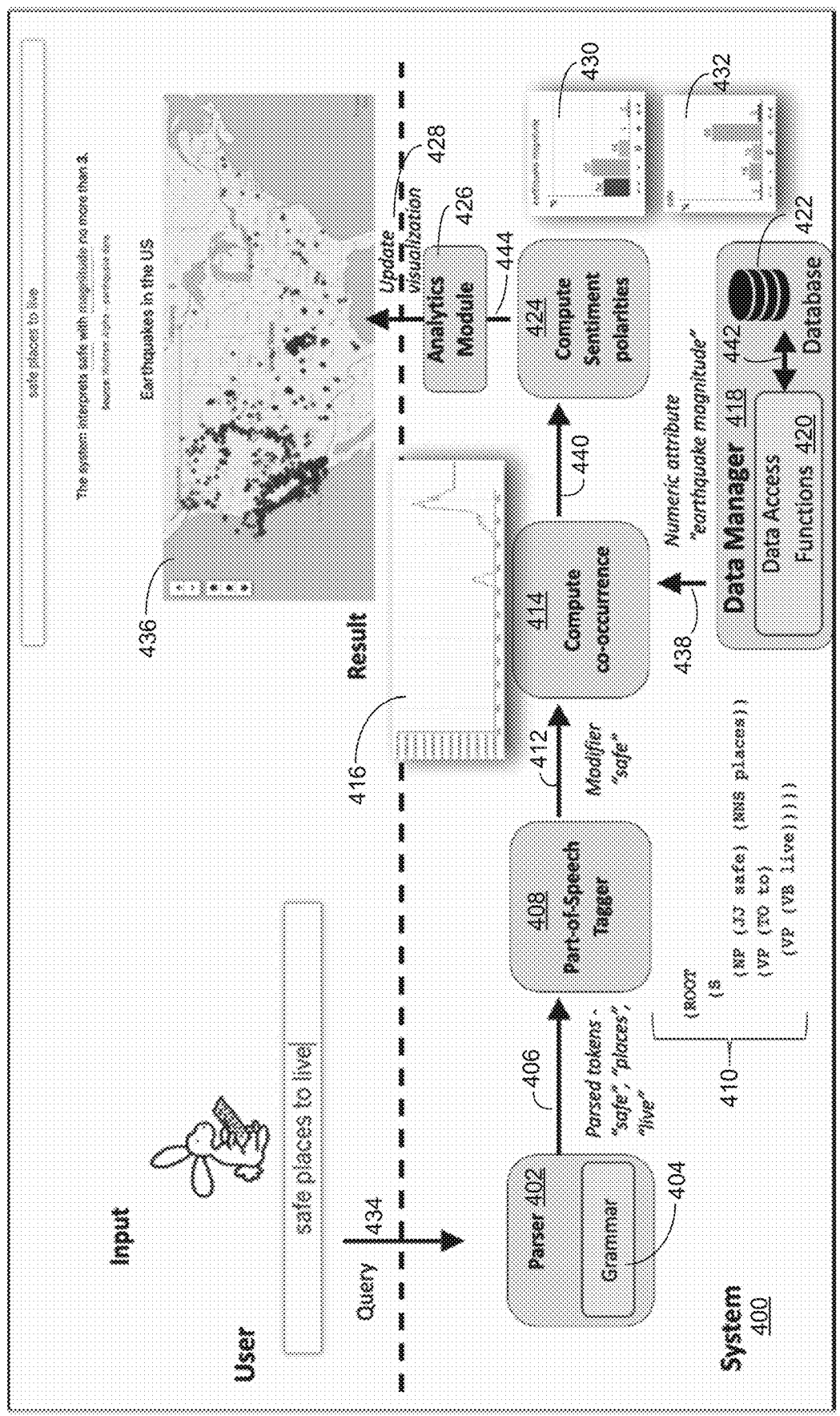
FIG. 4A is a schematic diagram of a system that interprets vague intent modifiers in visual analysis using word co-occurrence and sentiment analysis, according to some implementations.

FIG. 4A provides a schematic diagram of a system 400 that interprets vague intent modifiers in visual analysis using word co-occurrence and sentiment analysis, according to some implementations. Some implementations use the system 400 that interprets vague modifiers, such as "safe" and "struggling," in a natural language (NL) interface for visual analysis. In some implementations, the system 400 employs a web-based architecture. In some implementations, an input query 434 (e.g., "safe places to live") is processed by a parser 402 (e.g., an ANTLR parser) using a grammar 404 (e.g., a context-free grammar) to output parsed tokens 406 (e.g., the tokens "safe," "places," and "live").

In some implementations, a part-of-speech tagger 408 identifies modifier adjectives (e.g., the modifier "safe") and their referring numerical data fields 412, based on the parsed tokens 406. A result 410 of the part-of-speech tagger 408 is shown. In some implementations, the result 410 has a tree syntax of tags. For this example, the root of the tree is shown as "ROOT". The tags include a tag NP, which indicates a noun phrase (e.g., "safe places"), which in turn includes a tag JJ that indicates an adjective (e.g., "safe" 412), and a tag NNS that indicates a plural noun (e.g., "places"). The tags also include a tag VP, which indicates a verb phrase which in turn indicates a tag TO that indicates the auxiliary word "to," and another tag VP, which indicates a verb phrase with a verb base tag VB (e.g., "live").

In some implementations, a module 414 computes (440) semantic relatedness (sometimes called co-occurrence) between the modifiers 412 and names of the numerical data fields, using a co-occurrence measure, thereby identifying one or more co-occurring numerical data fields for the modifiers 412. Some implementations use a stored corpus of natural language utterances to identify names that co-occur with a modifier. For example, a data field name is selected if it co-occurs with the modifier more than a predefined number of times (e.g., more than 5 times) in the stored corpus, according to some implementations. Some implementations use a co-occurrence measure, an example of which is described below. In some implementations, a data manager 418 provides information 438 about the numerical data fields 412 (e.g., the name of the data field "earthquake magnitude") and/or executes queries (e.g., using data access functions 420) to retrieve data 442 from a database 422.

In some implementations, a module 424 identifies sentiment polarities 444 (e.g., individual sentiment scores) for co-occurring modifiers and the numerical data fields 440.

In some implementations, an analytics module 426 determines numerical ranges for the numerical data fields based on the sentiment polarities. In FIG. 4A, the data distribution of values of the data field "earthquake magnitude" for different sentiment polarities is shown in a bar chart 430. FIG. 4A also shows another bar chart 432, which corresponds to distribution of the modifier (keyword "safe" in this example) for different sentiment polarities. See also bar charts 466 and 468 in FIG. 4C.

In some implementations, a visualization result 436 (sometimes called a data visualization) is then generated and displayed (428) to show widgets and filters in play, according to some implementations.

In some implementations, the parser 402, the part-of-speech tagger 408, the module 414 that computes co-occurrence, and the analytics module 426 are implemented in the language processing module 238 and/or in the inferencing module 239 described above. In some implementations, the data manager 418 is implemented as part of the database or data sources 102, and/or as part of the language processing module 238.

Example Algorithm for Interpreting Vague Modifiers

An example algorithm for interpreting modifiers based on identifying co-occurring data fields and their values is shown below, according to some implementations. Each component is described in detail in the following subsections.

---

Algorithm: Interpretation of Vague Modifiers
   Input: Natural language utterance α
   Output: Generate visualization response
   α is the Natural Language input utterance.
   m is the vague modifier in the utterance α.
   Part-of-Speech tagger POS 408 identifies m in α.
   $attrs_{num}$ is the set of numerical data fields in the dataset D.
   $attrsc_{num}$ is the set of co-occurring numerical data fields in D
      with $attrsc_{num} \subseteq attrs_{num}$.

-continued

PMI computes co-occurrence scores $w_c$ for m and each numeric field in attrs$_{num}$.
polarity computes sentiment polarities p for m and each numeric field in attrsc$_{num}$.
1. Invoke POS(α), returning m.
2. Compute PMI(m,attrs$_{num}$) → $w_c$ for each attr$_i$ G attrsc$_{num}$.
3. Compute polarity(m, attrs$_{cnum}$) → p.
4. Generate visualization and/or update interface based on $w_c$ and p.

Example Methods for Parsing Vague Modifiers

Vague modifiers are gradable adjectives that modify nouns and are associated with an abstract scale ordered by their semantic intensity. For example, the gradable adjective "fast" in the phrase "a fast car" describes the intensity of a speed measure for the "car" attribute. Gradable adjectives can be broadly classified into two categories based on their interpretation as measure functions. Numerical graded adjectives such as "large" and "cheap" are viewed as measurements that are associated with a numerical quantity for size and cost respectively. In contrast, complex graded adjectives like "good" and "healthy" tend to be underspecified for the exact feature being measured.

While the interpretation of numerical gradable adjectives has been explored in Natural Language interfaces for visual analysis, conventional methods cannot handle complex gradable adjectives. Some implementations apply a commonly used performant part-of-speech (POS) tagger 408 during the parsing process to identify these complex gradable adjectives and their referring attributes in the Natural Language utterances.

Example Methods for Computing Modifier and Attribute Co-Occurrence Scores

Some implementations subsequently map the vague modifier to a scale based on its semantic intensity so that the modifier can be interpreted as a set of numerical filters for generating a visualization response. Some implementations use linguistic models that represent the subjectivity of complex modifiers as a generalized measure function mapping the modifier to numerical attributes in a multidimensional space. For example, the subjectivity of the modifier "healthy" can be interpreted along several dimensions of "weight," "amount of exercise," and "number of hospital visits." These attributes can be used independently, or in the aggregate, such as a weighted linear combination.

Some implementations compute the semantic relatedness between the modifier and the numerical data fields using a co-occurrence measure. Some implementations use an extensive Google n-grams corpus (e.g., to have a broad coverage for co-occurrence). To maximize the chances of co-occurrence, some implementations consider co-occurrence between all n-gram combinations of the modifier and the data field names. For example, some of the n-grams for the data field name "income per capita" are "income per capita," "income per," "per capita," and "income."

Some implementations use a Pointwise Mutual Information Measure (PMI), an information-theoretic measure that quantifies the probability of how tightly occurring a modifier m and a numerical data field attr$_{num}$ are to the probability of observing the terms independently. Some implementations consider any numerical data field attrc$_{num}$ that has a non-zero PMI score, indicating the presence of a co-occurrence with m. In some implementations, the PMI of a modifier n-gram $t_m$ with one of the data field name n-grams tatty is calculated using Equation (1) shown below:

$$PMI(t_m, t_{attr}) = \log \frac{p(t_m, t_{attr})}{p(t_m)p(t_{attr})} \quad (1)$$

Figure 4B:
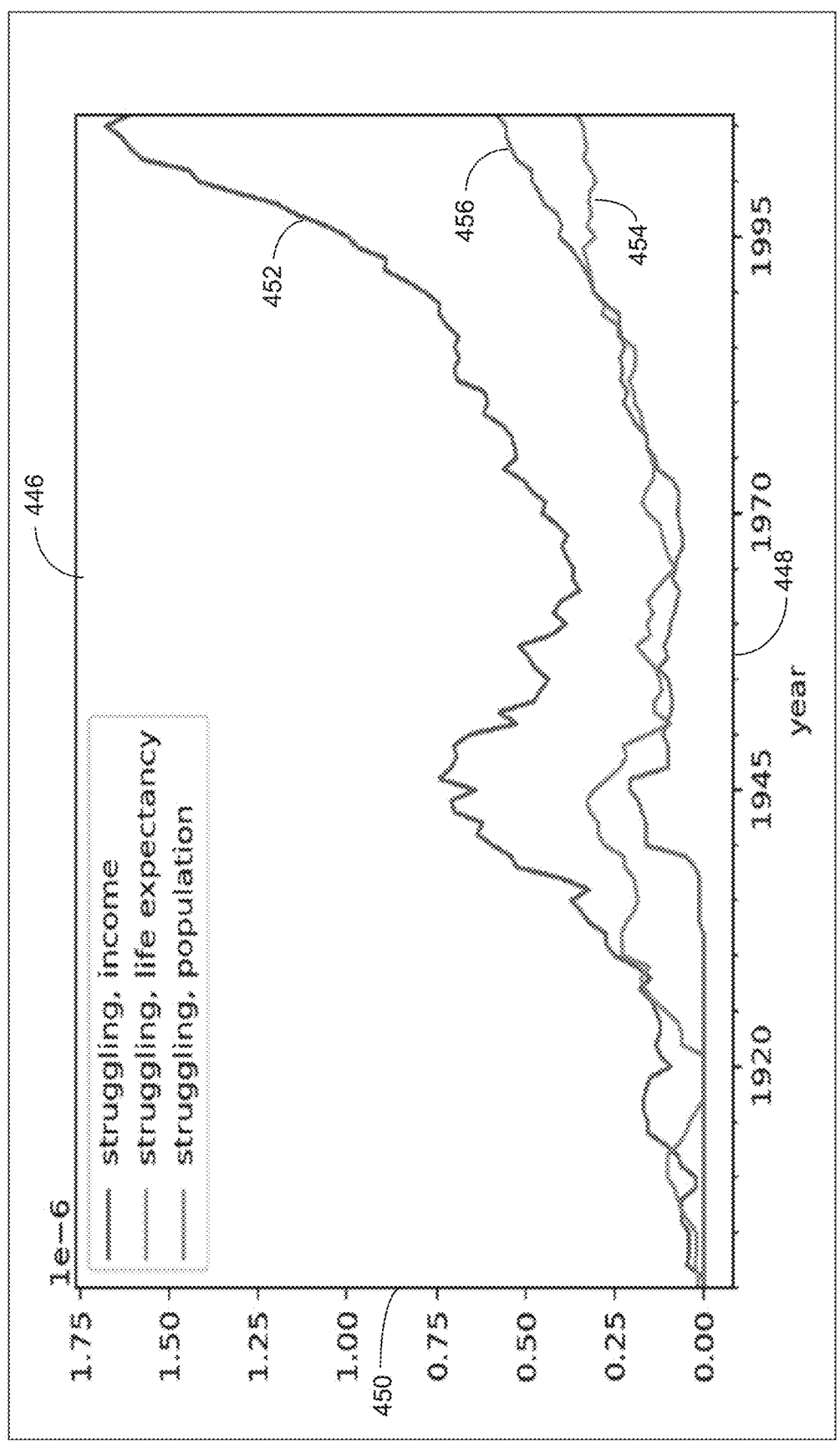
FIG. 4B shows an example graph according to some implementations.

FIG. 4B shows an example graph 446 that plots PMI values for a modifier with data field name n-grams, according to some implementations. In this example, the y-axis 450 corresponds to PMI values for the modifier "struggling" with each of the data field name n-grams, "income" (line 452), "Life Expectancy" (line 454), and "population" (line 456), between the years (x-axis 448) 1900 and 2006 in the Google n-gram corpus, according to some implementations. Higher PMI scores indicate a higher co-occurrence of the modifier and data field name terms. For this example, the graph indicates that the data field named "income" has the highest co-occurrence with the modifier "struggling", the data field name named "population" has the next highest co-occurrence followed by the data field named "Life Expectancy", after the year 1995.

Example Methods for Determining Sentiment Polarities

Once the modifier is semantically associated with co-occurring numerical attributes, some implementations determine a reasonable numerical range to associate with the modifier. Sentiment polarity analysis is a linguistic technique that uses positive and negative lexicons to determine the polarity of a phrase. One of the benefits of employing such a technique is the ability to dynamically compute the sentiment of the phrase based on the context in which its terms co-occur rather than pre-tagging the phrase with absolute polarities, which is often not scalable.

Figure 4C:
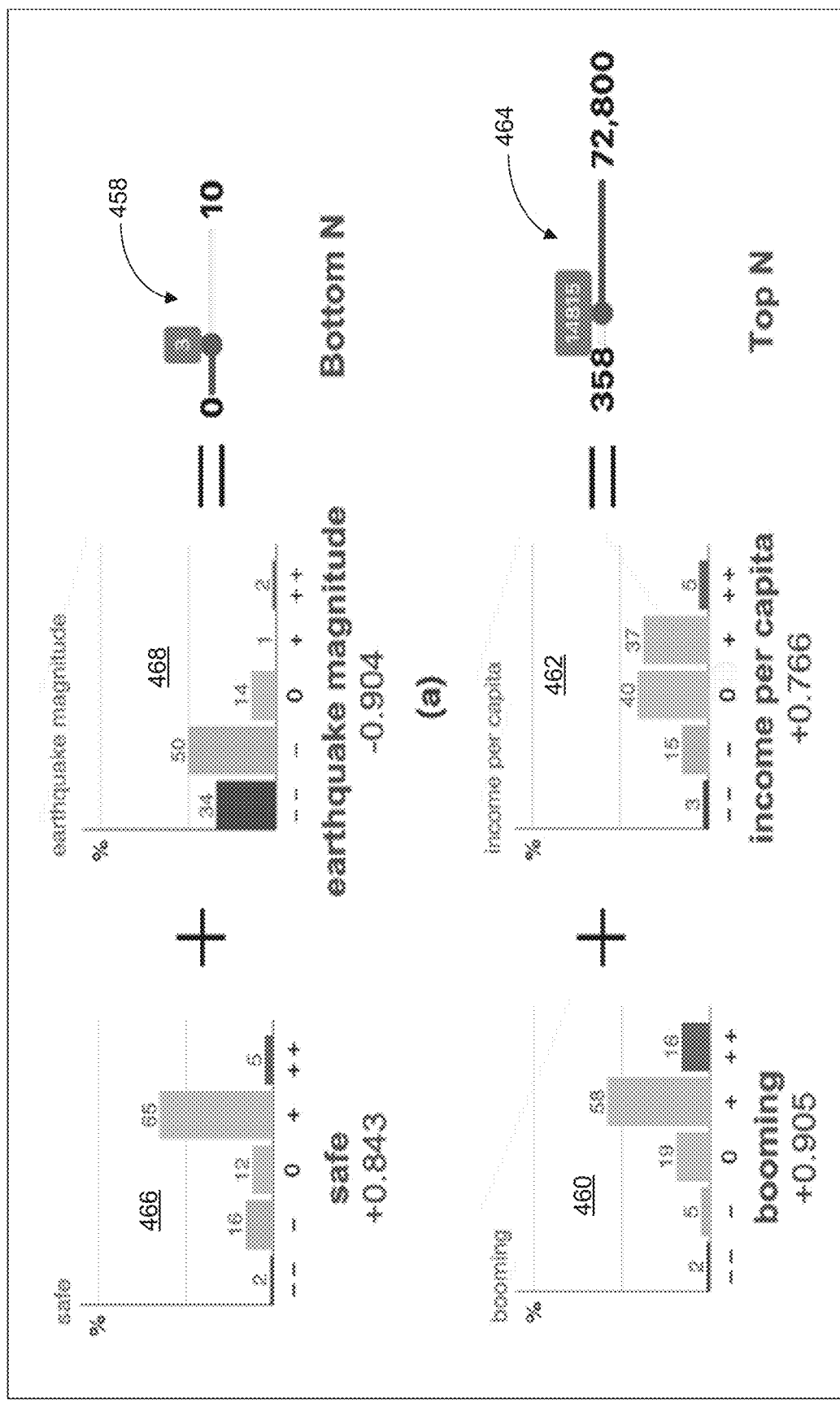
FIG. 4C illustrates sentiment polarity logic with sentiments and their normalized scores for the modifiers and names of numerical data fields, according to some implementations.

FIG. 4C illustrates sentiment polarity logic with sentiments and their normalized scores for the modifiers and names of numerical data fields, according to some implementations. In the first example 466 and the second example 468, the modifier "safe" and the data field "earthquake magnitude" have positive and negative sentiments respectively. This is deduced from the number of instances that are associated with negative sentiment polarities (indicated by "−−" for very negative, and "−" for negative), neutral sentiment polarity (indicated by "0"), and positive sentiment polarities (indicated by "+" for positive, and "++" for very positive). Based on this deduction, and the fact that the modifier and the data field name have dissimilar sentiment polarities, some implementations use a Bottom N range 458 for the data field ("earthquake magnitude" in this example). For this example, the system computes a numerical range for values of the data field "earthquake magnitude" as magnitudes 3 and lower. Some implementations also use a well-known scale for determining numerical ranges for numerical data fields. For example, the system determines the earthquake magnitude values based on the Richter scale. In contrast, as shown in the graph plots 460 and 462, the modifier "booming" and the data field "income per capita" both have positive sentiments, so the system computes the Top N values 464 for the "income per capita" data field, according to some implementations. Some implementations compute the numeric range for the numerical data fields further based on statistical properties of the data.

Some implementations determine the individual sentiment scores with a sentiment classification technique based on a recursive neural tensor network that handle negations and predict sentiments of terser phrases. In some implementations, the sentiments are returned as a 5-class sentiment classification: very negative, negative, neutral, positive, or very positive. The values can be normalized to the interval [−1, +1], ranging from negative to positive to provide an overall sentiment. Some implementations subsequently determine the numerical ranges for the numerical data field $attrc_{num}$ based on sentiment polarity of the modifier m ($sentiment_m$) and sentiment polarity of the co-occurring numerical data field $attrc_{num}$ ($sentiment_{attr\_cnum}$) pair using the following combinatorial logic:

```
if    (sentiment_m is positive or sentiment_m is neutral) and
      (sentiment_{attr_cnum} is positive or sentiment_{attr_cnum} is neutral) then
      Compute TopN(attrc_{num}).
else if (sentiment_m is positive or sentiment_m is neutral) and
      (sentiment_{attr_cnum} is negative) then
      Compute BottomN(attrc_{num}).
else if sentiment_m is negative and
      (sentiment_{attr_cnum} is positive or sentiment_{attr_cnum} is neutral) then
      Compute BottomN(attrc_{num}).
else if sentiment_m is negative and sentiment_{attr_cnum} is negative then
      Compute TopN(attrcnum).
end if
```

Some implementations use the sentiment polarities to compute the Top N and Bottom N numerical ranges for the numerical data fields. In various implementations, these ranges are computed in two ways: if the attribute is associated with additional domain-specific enrichment, the system uses the information for determining a default. For example, for the instance shown in top portion in FIG. 4C, the system uses the Richter scale to find a magnitude range for lower severity. If additional knowledge does not exist, as is the case for the example shown in bottom portion in FIG. 4C, the system computes the Top N in the range [med+MAD, max] or Bottom N in the range [min, abs(med−MAD)], where med, MAD, min, and max are the median, median absolute deviation, minimum, and maximum values for $attrc_{num}$. Some implementations choose MAD as it is a robust measure of the data spread, and tends to be less affected by non-normality. Some implementations generate a visualization response with the range filters in play.

Example User Interfaces

Figure 5A:
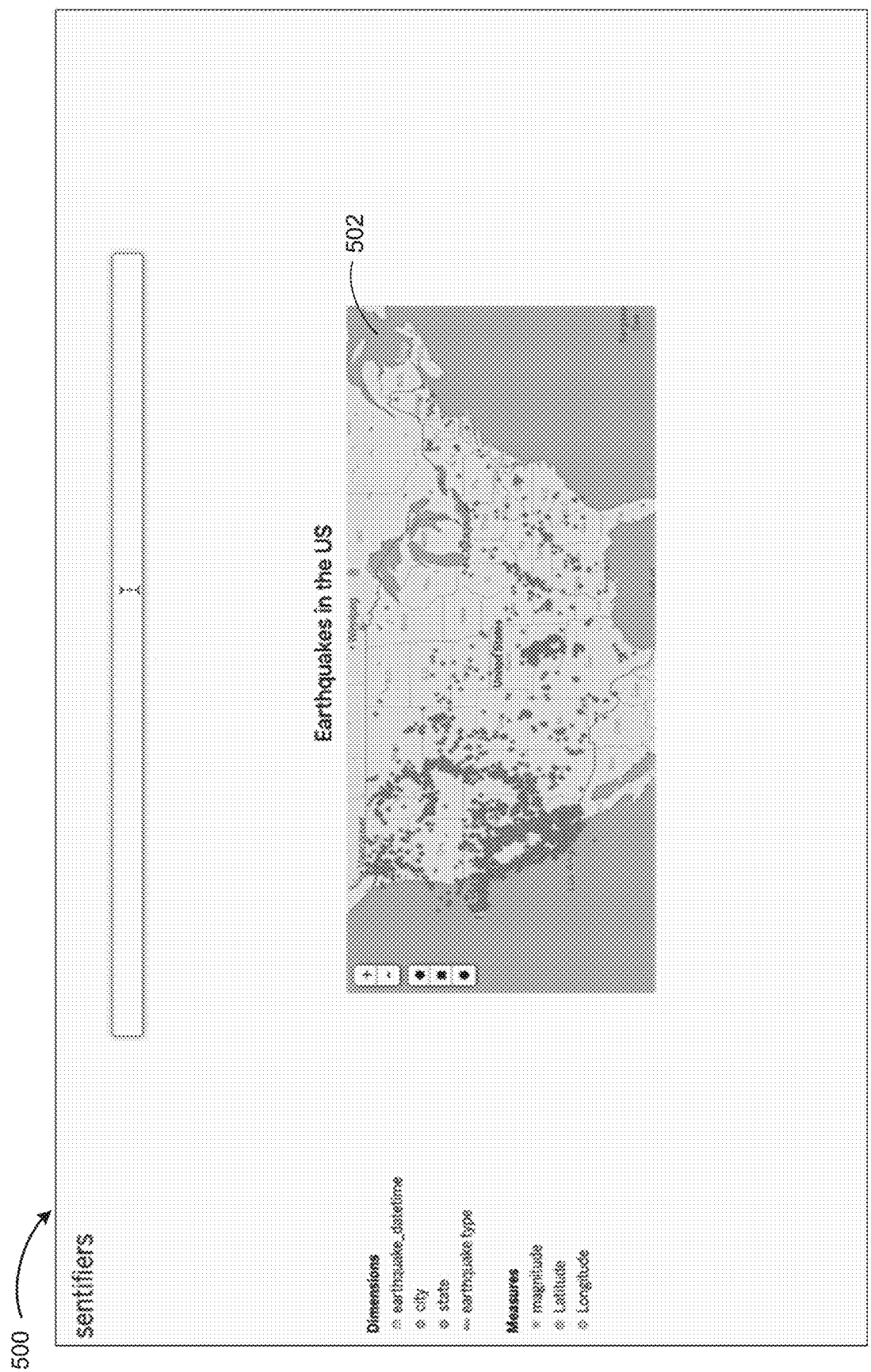
FIGS. 5A-5M provide examples of data visualizations in accordance with some implementations.
Figure 5B:
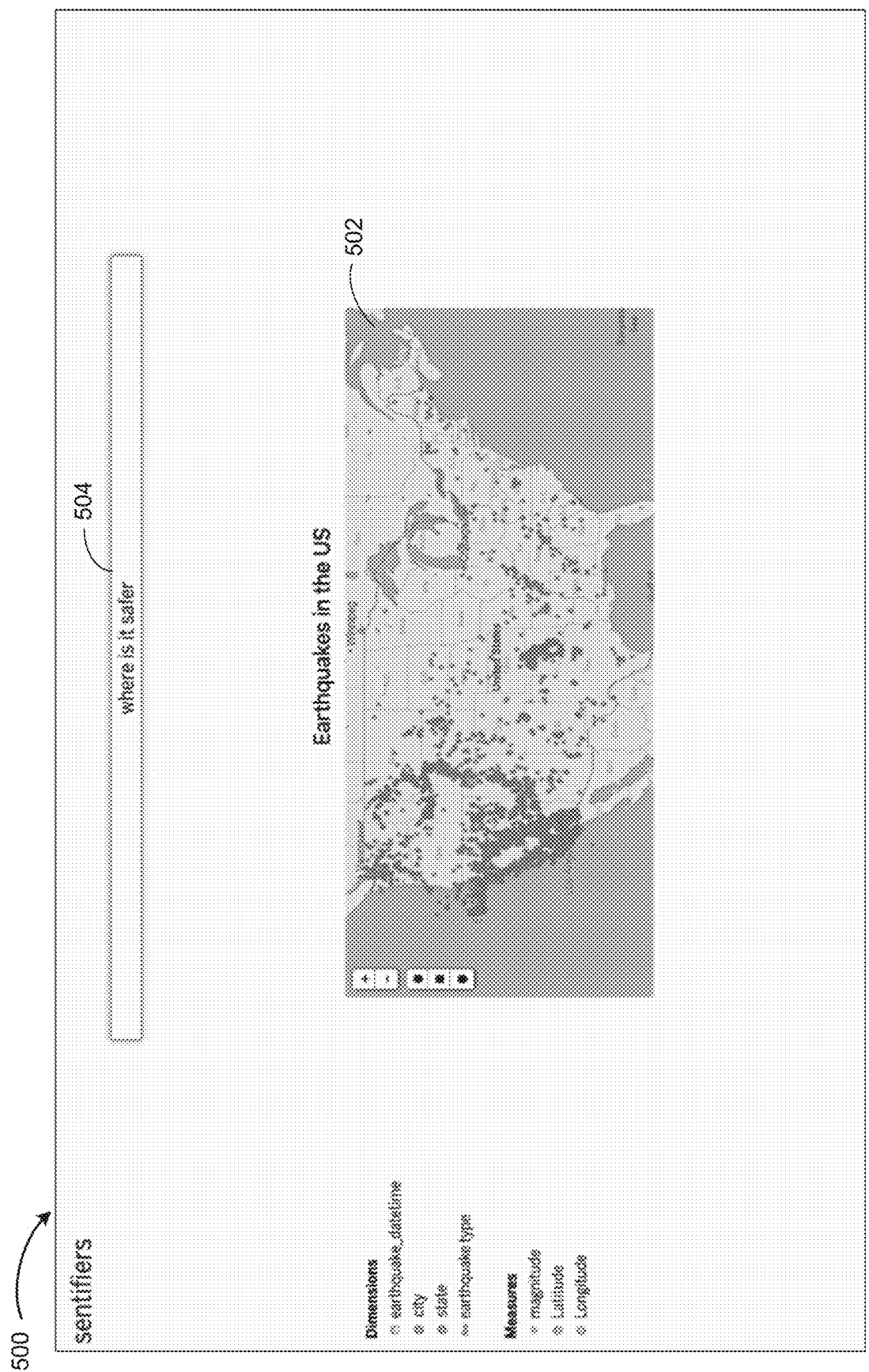
Figure 5C:
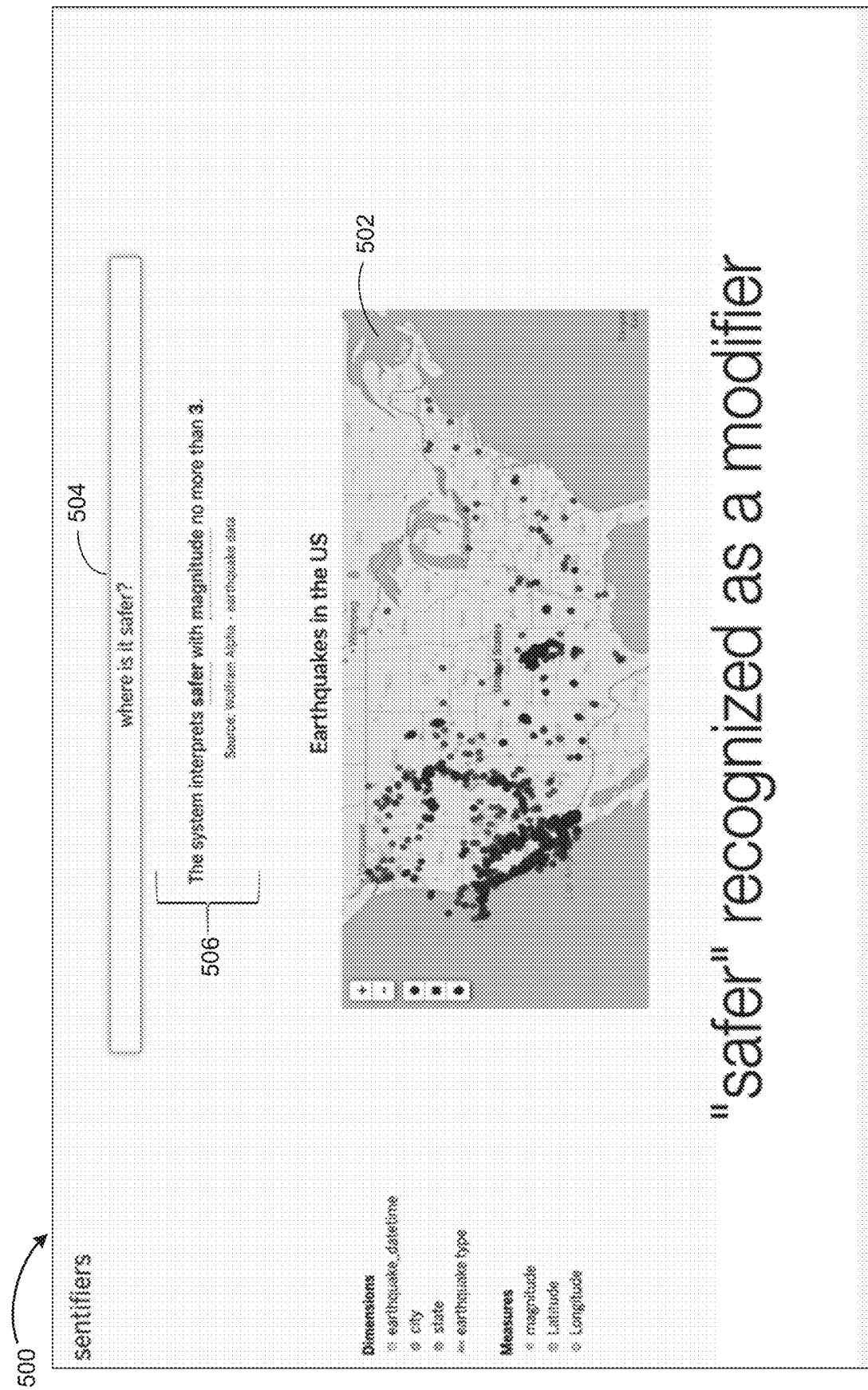
Figure 5D:
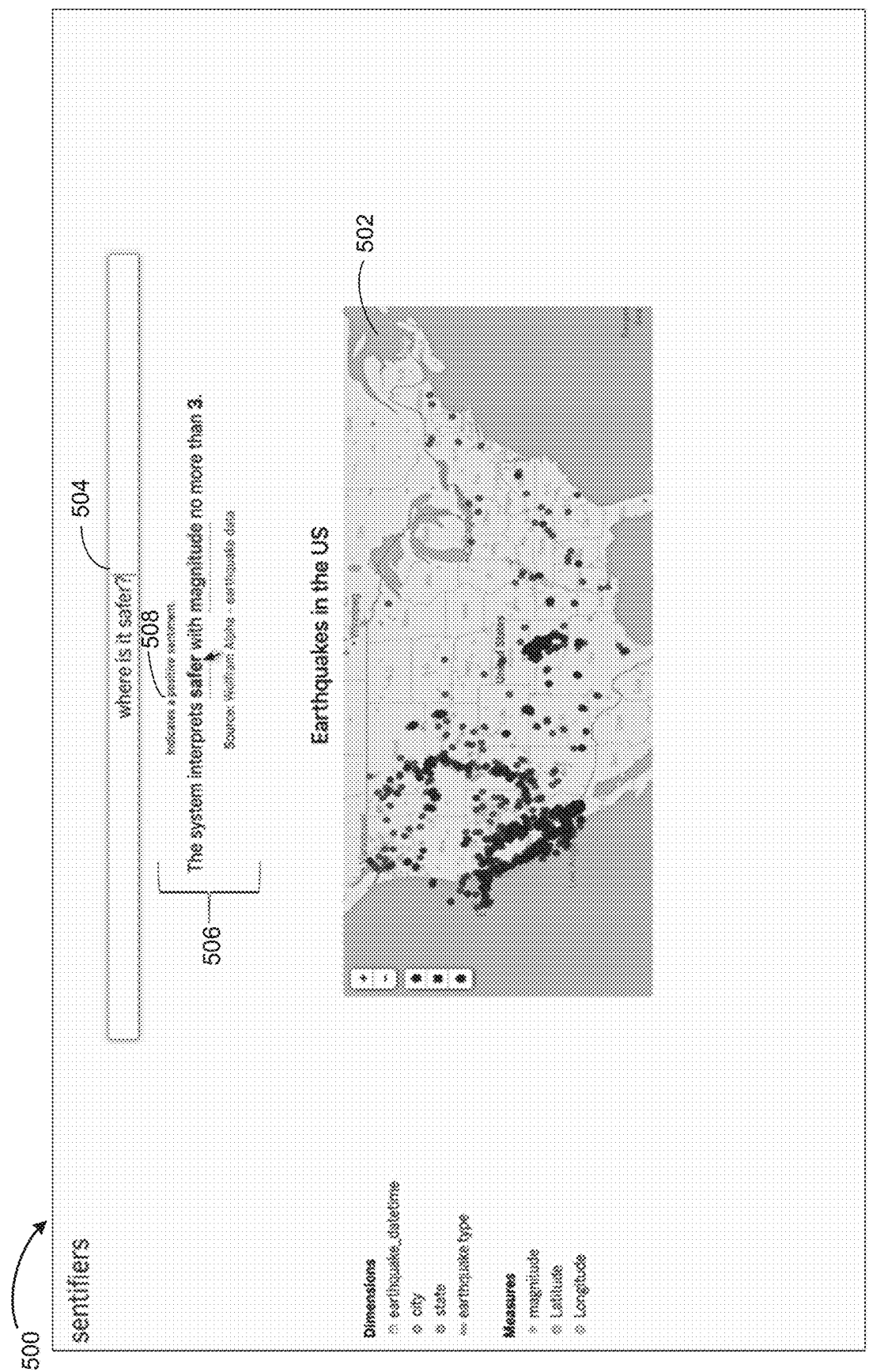
Figure 5E:
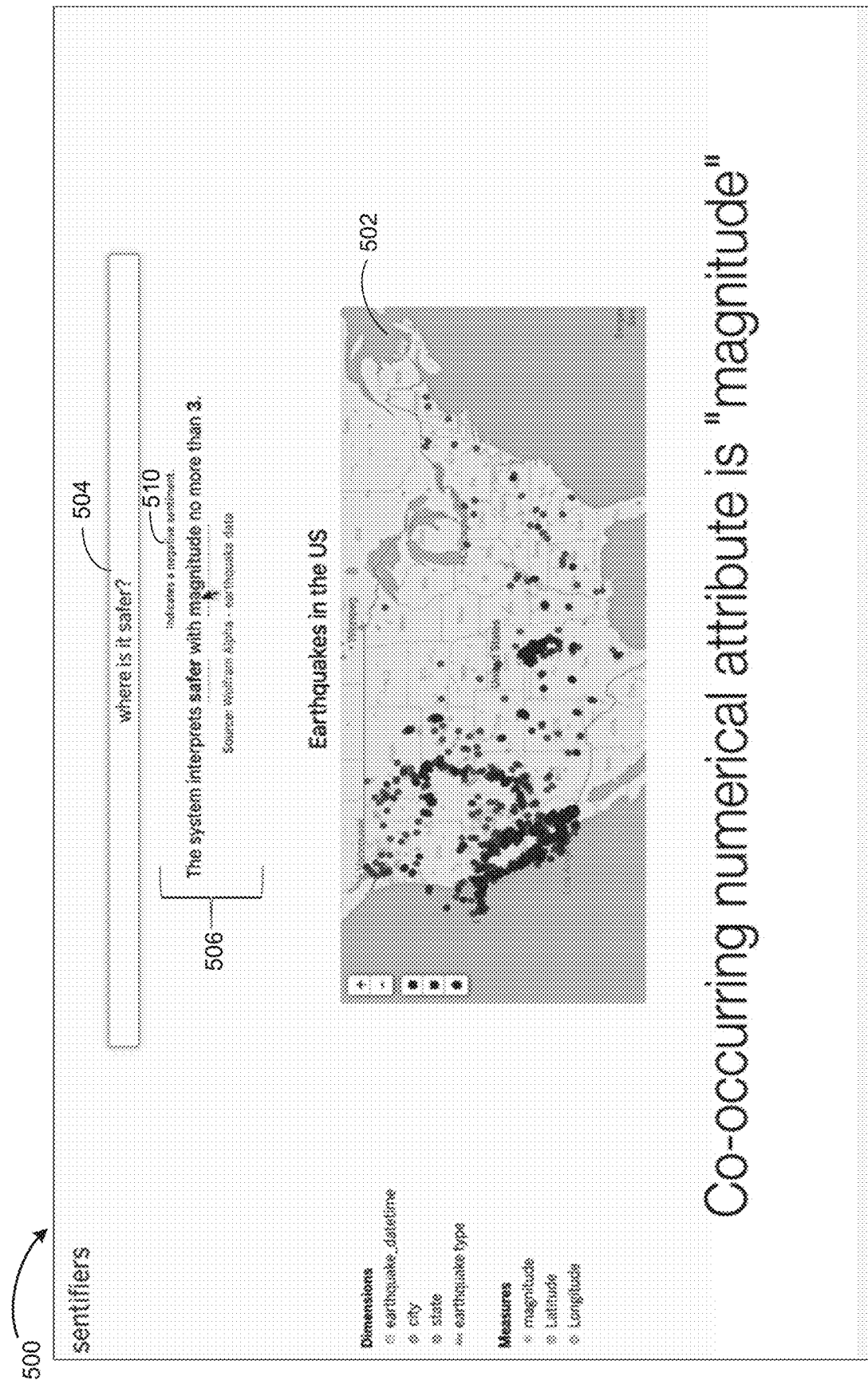
Figure 5F:
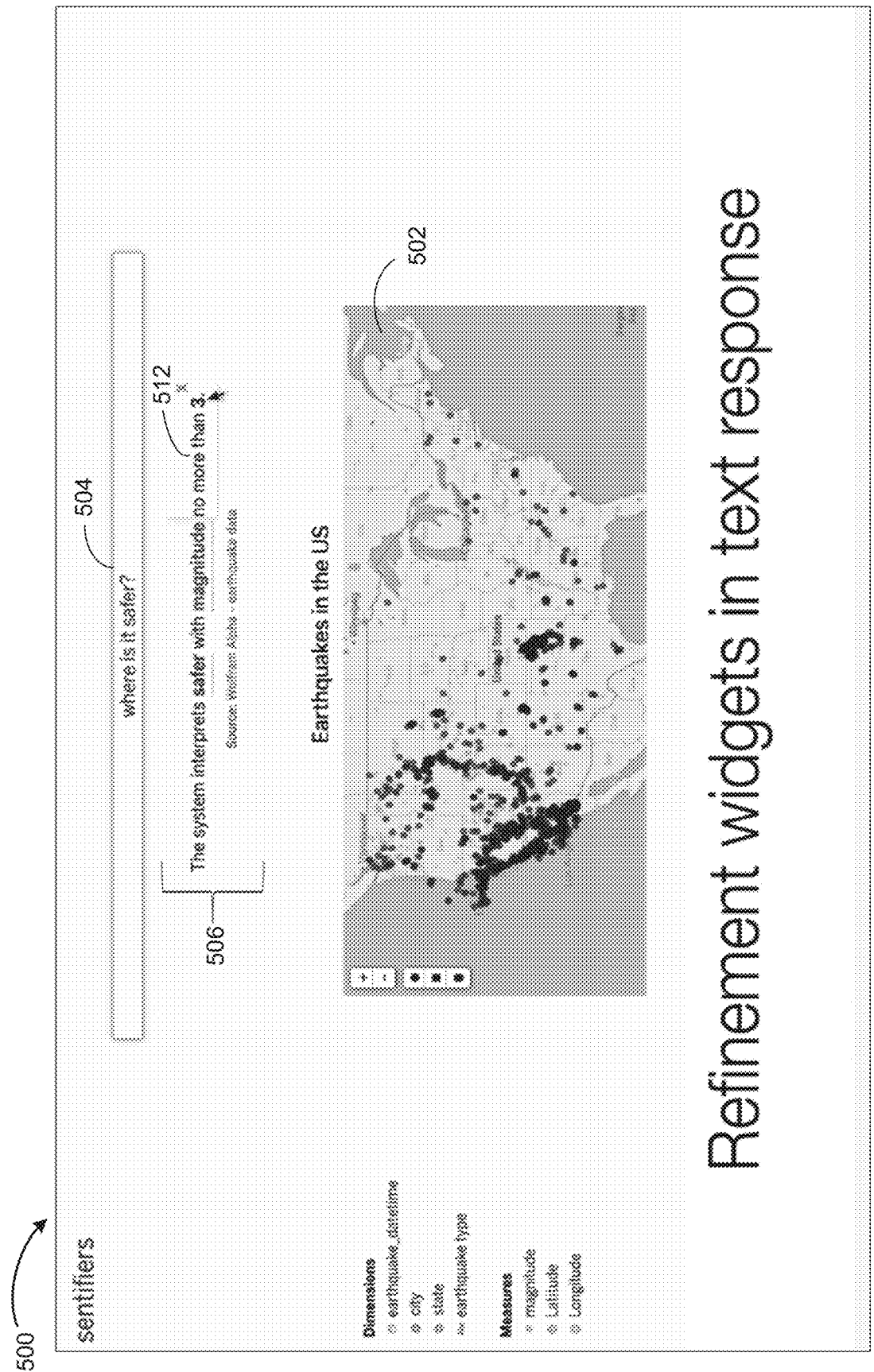
Figure 5G:
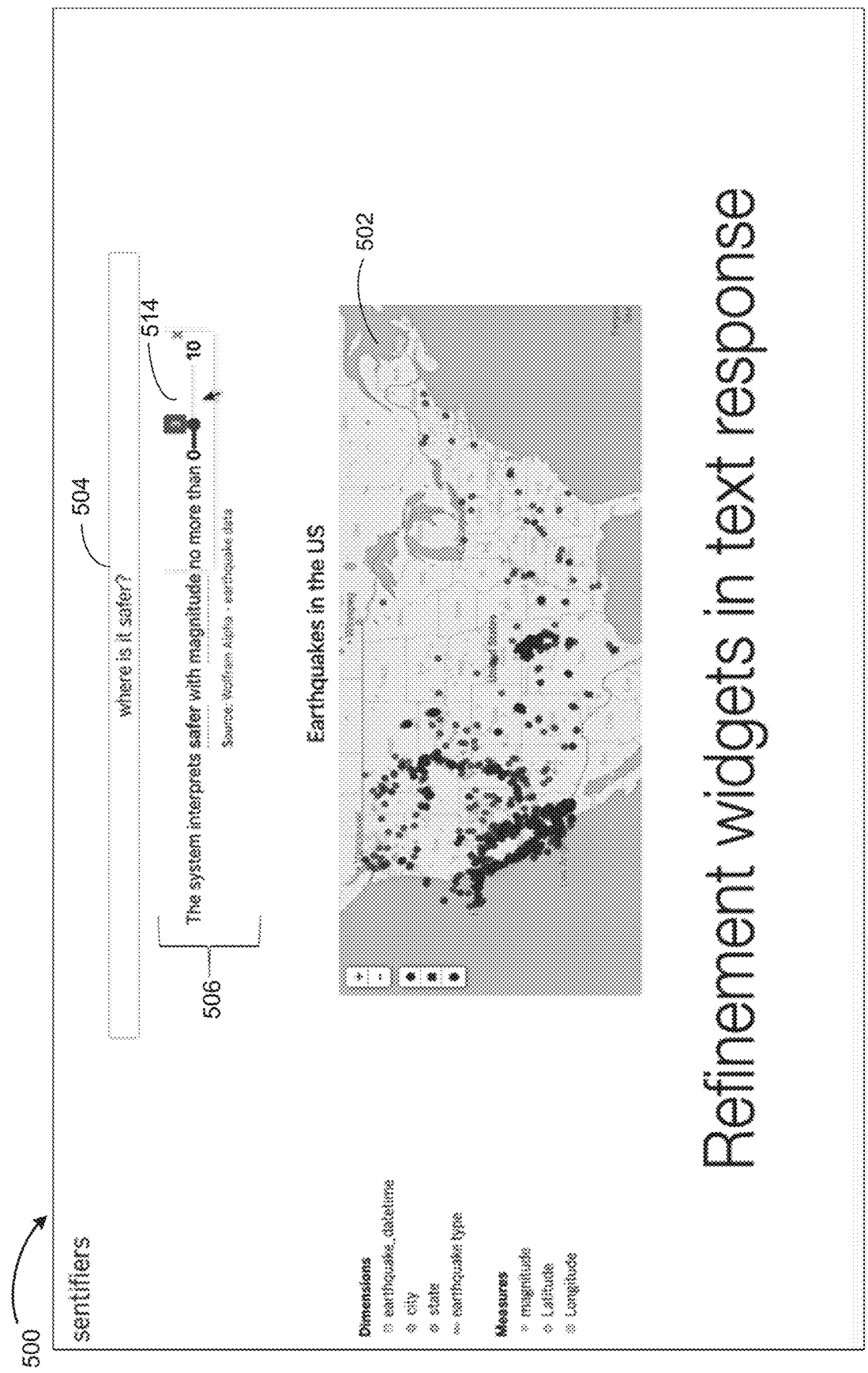

FIGS. 5A-5M provide examples of data visualizations in accordance with some implementations. FIG. 5A shows a graphical user interface 500 with a data visualization 502 of a dataset of earthquakes in the US (e.g., from Wolfram Alpha earthquake data), according to some implementations. FIG. 5B shows a user providing an input "where is it safer." As shown in FIG. 5C, the system recognizes the keyword "safer" as a modifier (e.g., a modifier of the keyword "where" (or a place)), and identifies a numerical data field (sometimes called an attribute) "magnitude" that co-occurs with the keyword "safer" in a predefined corpus of natural language utterances. In other words, the system interprets the keyword "safer" as the numerical data field "magnitude" together with a numeric range. Some implementations provide details of the interpretation or a text response 506 to notify and/or guide the user. Referring next to FIGS. 5D and 5E, the system also identifies that the keyword "safer" has a positive sentiment 508 while the term "magnitude" indicates a negative sentiment 510. Therefore, the system selects a bottom range, according to some implementations. As shown next in FIG. 5F, the system shows a numerical range, in the text response 506, according to some implementations. In this example, the text response 506 shows a bottom range 512 of "no more than 3" (e.g., selected from a numerical range of 0 to 10). As shown next in FIG. 5G, some implementations show a slider affordance 514, and/or similar refinement widgets. The user may slide the affordance 514 and choose a particular value for the corresponding data field ("magnitude" in this example). In response, the system updates the visualization 502 for the values of the data field "magnitude".

Figure 5H:
Figure 5I:
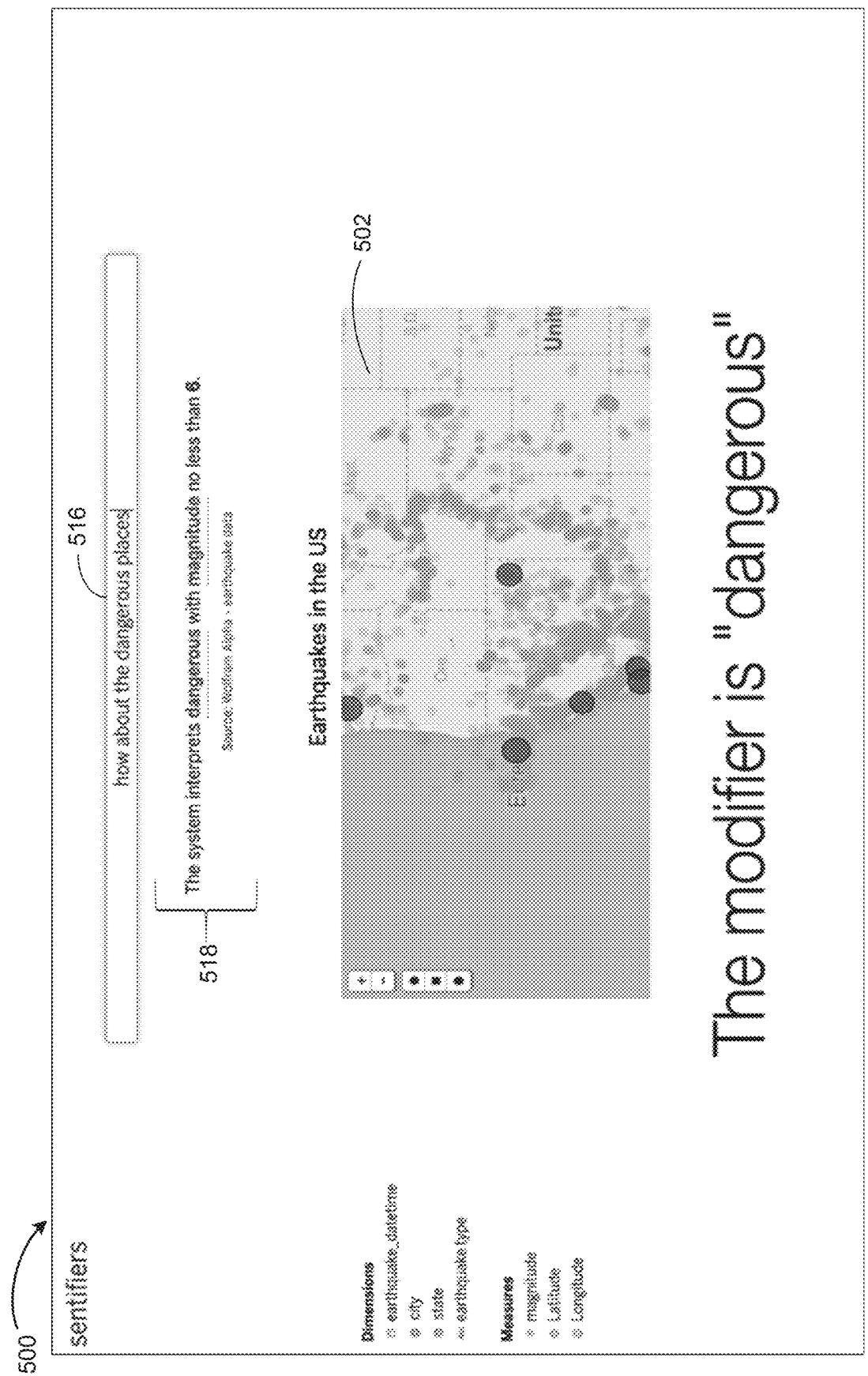
Figure 5J:
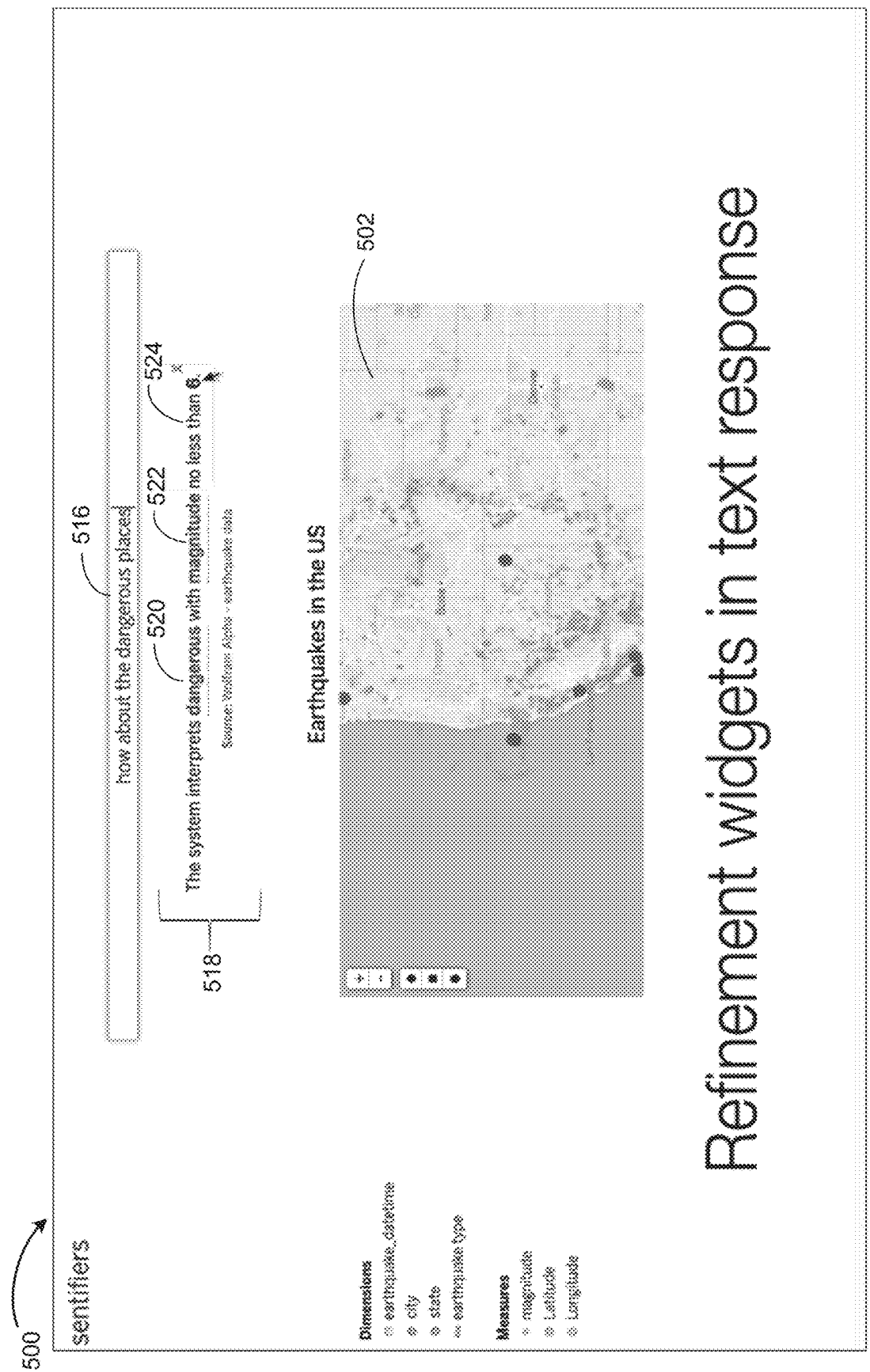
Figure 5K:
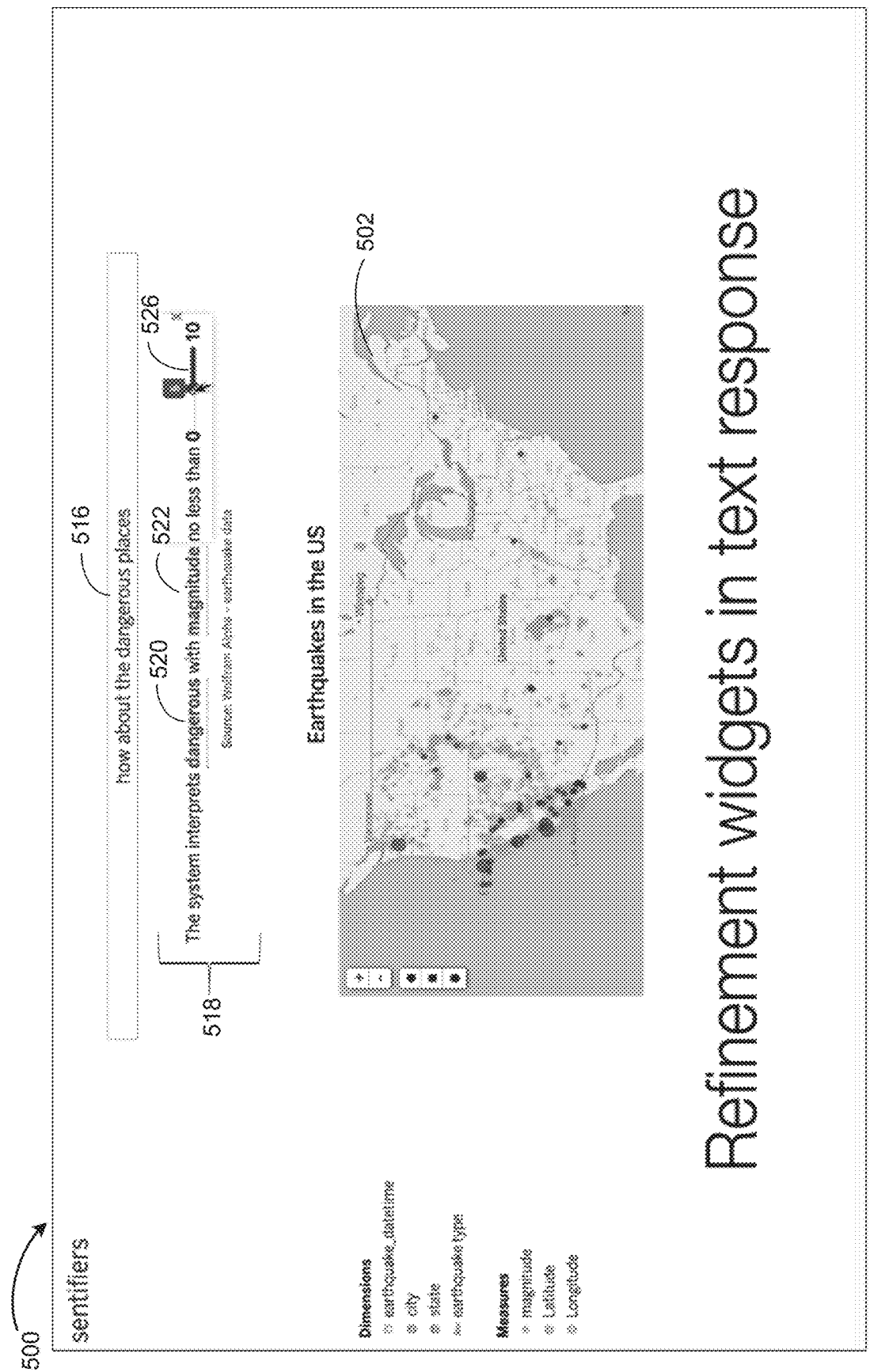
Figure 5L:
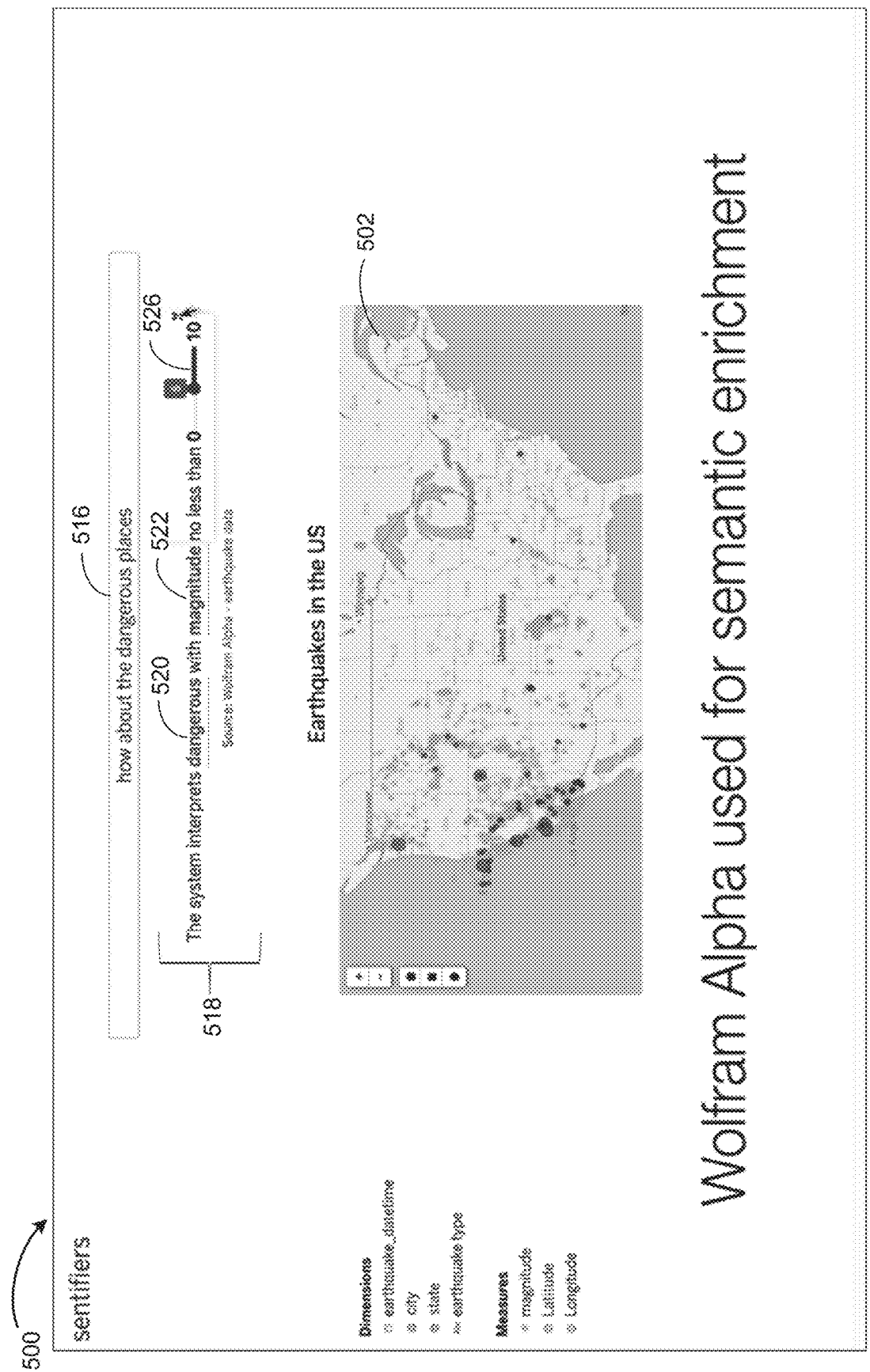
Figure 5M:
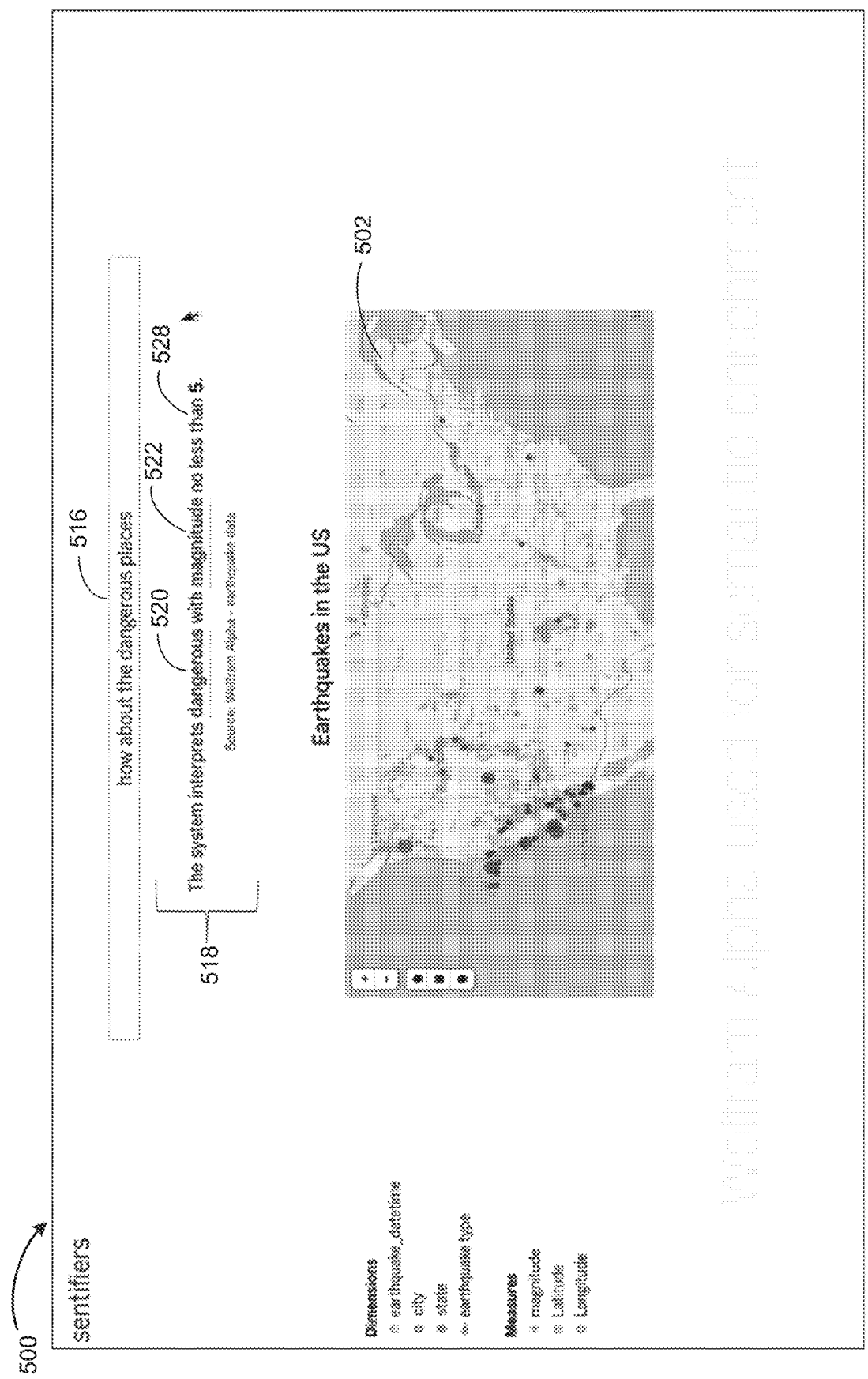

Referring next to FIG. 5H, suppose the user subsequently inputs "how about the dangerous places" 516. The system identifies the keyword "dangerous" as a modifier. The system also identifies the numerical data field "magnitude" that co-occurs with the keyword "dangerous." Next, as shown in FIG. 5I, the system shows a text response 518 that indicates that the system interprets the keyword "dangerous" with magnitude no less than 6, according to some implementations. As shown next in FIG. 5J, the keyword "dangerous" and the numerical data field "magnitude" 522 both have negative polarities. Accordingly, the system selects a top range (for numerical values of the numerical data field). For this example, the system selects a numeric range 524 of no less than 6 for the magnitude data field. As shown in FIG. 5K, in some implementations, the system generates a widget 526 (e.g., a widget with a slider affordance) that allows the user to refine the value for the numerical data field "magnitude." As shown next in FIG. 5L, in some implementations, the system uses a publically available knowledge base (sometimes called a knowledge engine or answer engine) for semantic enrichment. In this example, the system uses Wolfram Alpha for determining a default range for numerical data field "magnitude." In this example, the system interprets "magnitude" to refer to earthquake magnitudes and determines a default value of 0 to 10 (on the Richter scale) for the numerical data field. Finally, as shown in FIG. 5M, when the user selects a numeric range 528, the system updates the data visualization 502 for those values of the data field "magnitude."

Figure 6A:
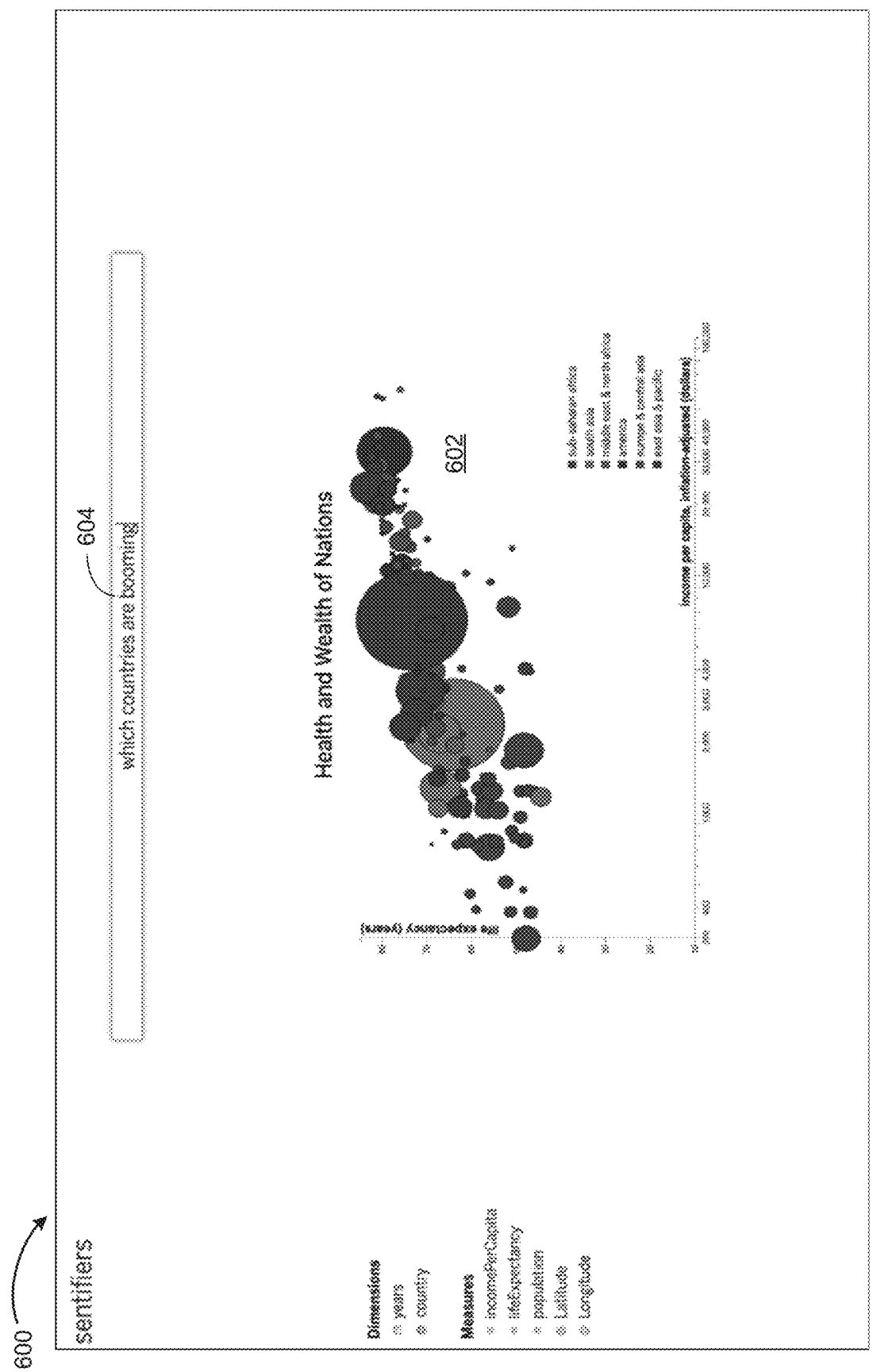
FIGS. 6A-6J provide further examples of data visualizations in accordance with some implementations.
Figure 6B:
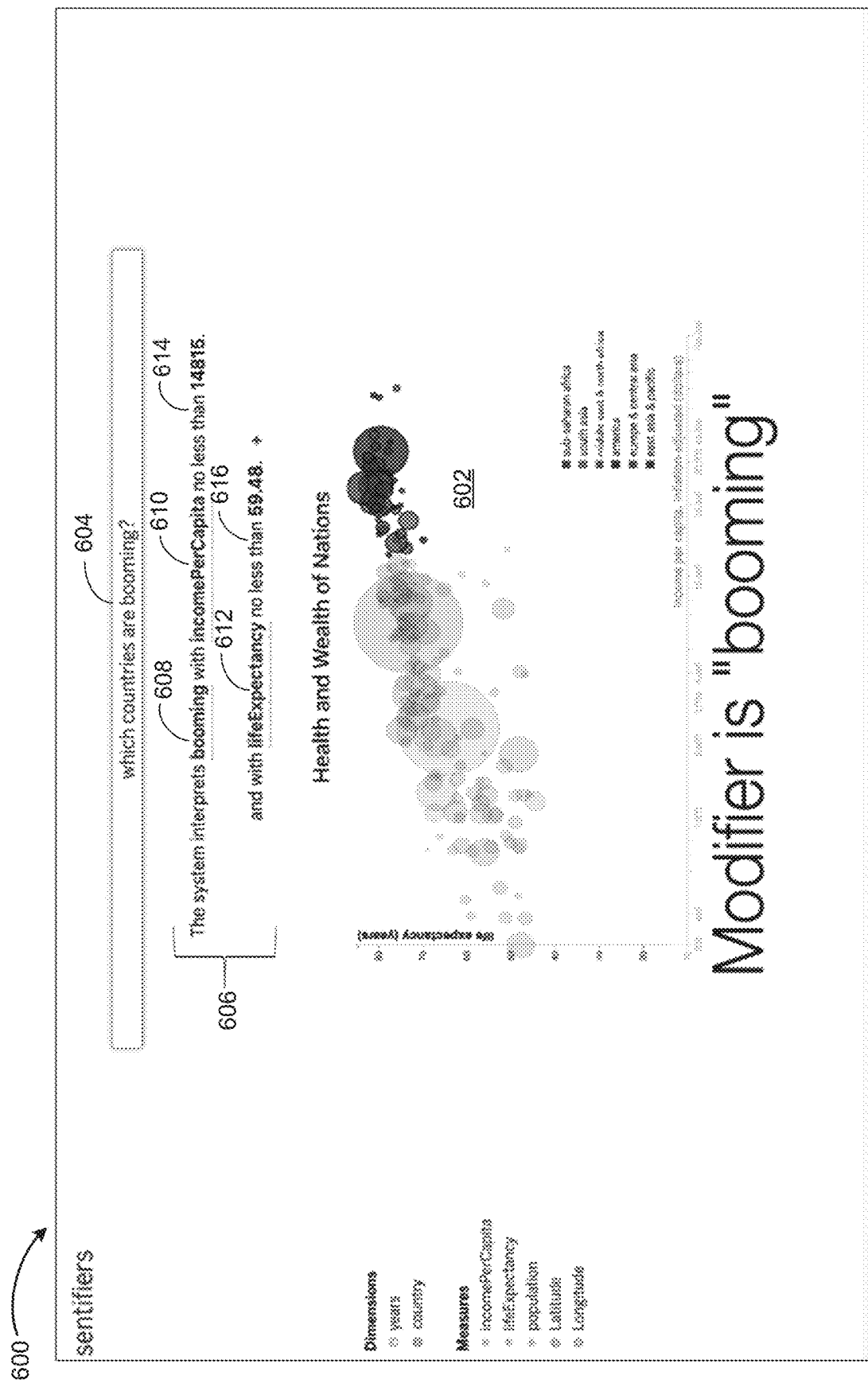
Figure 6C:
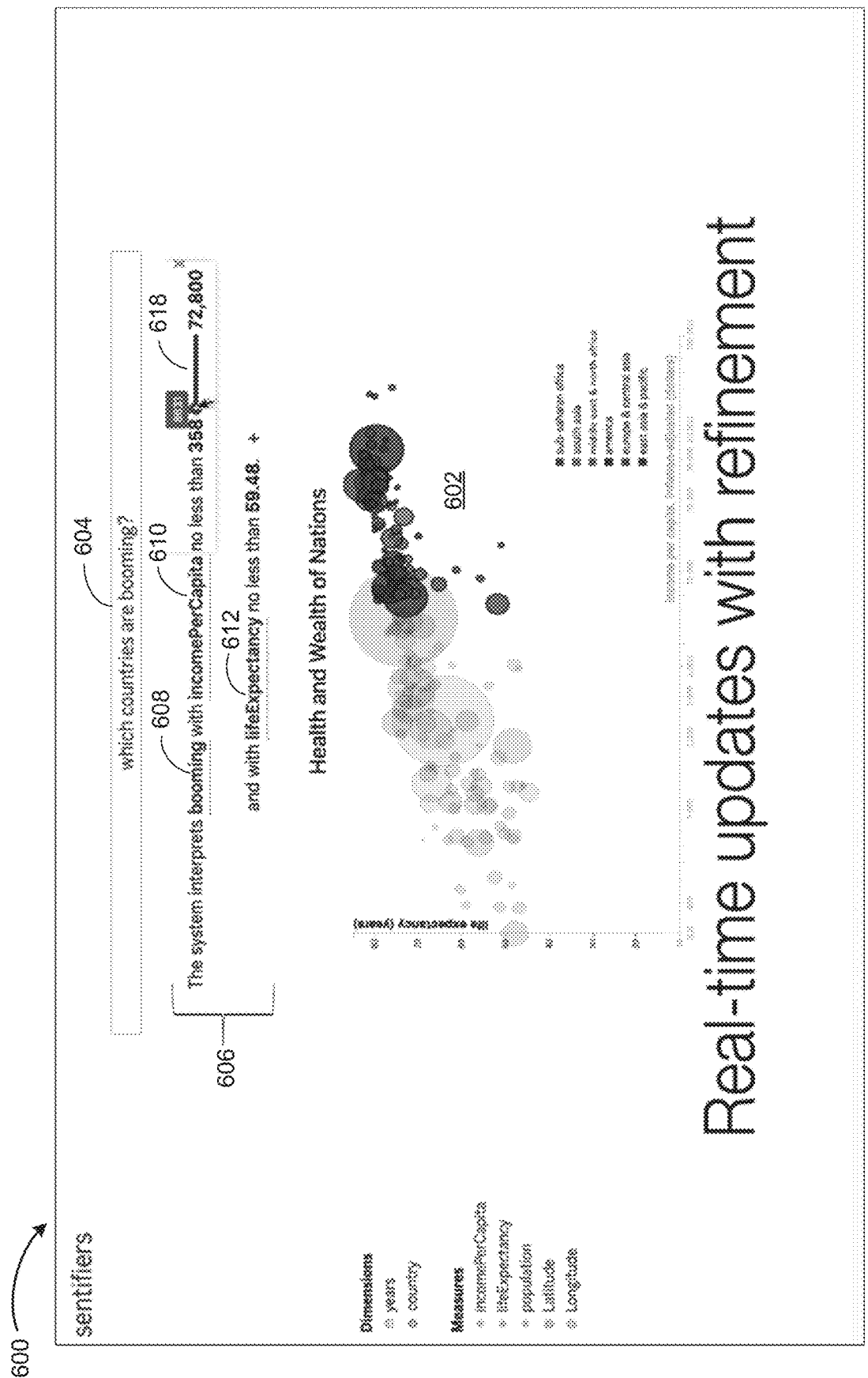
Figure 6D:
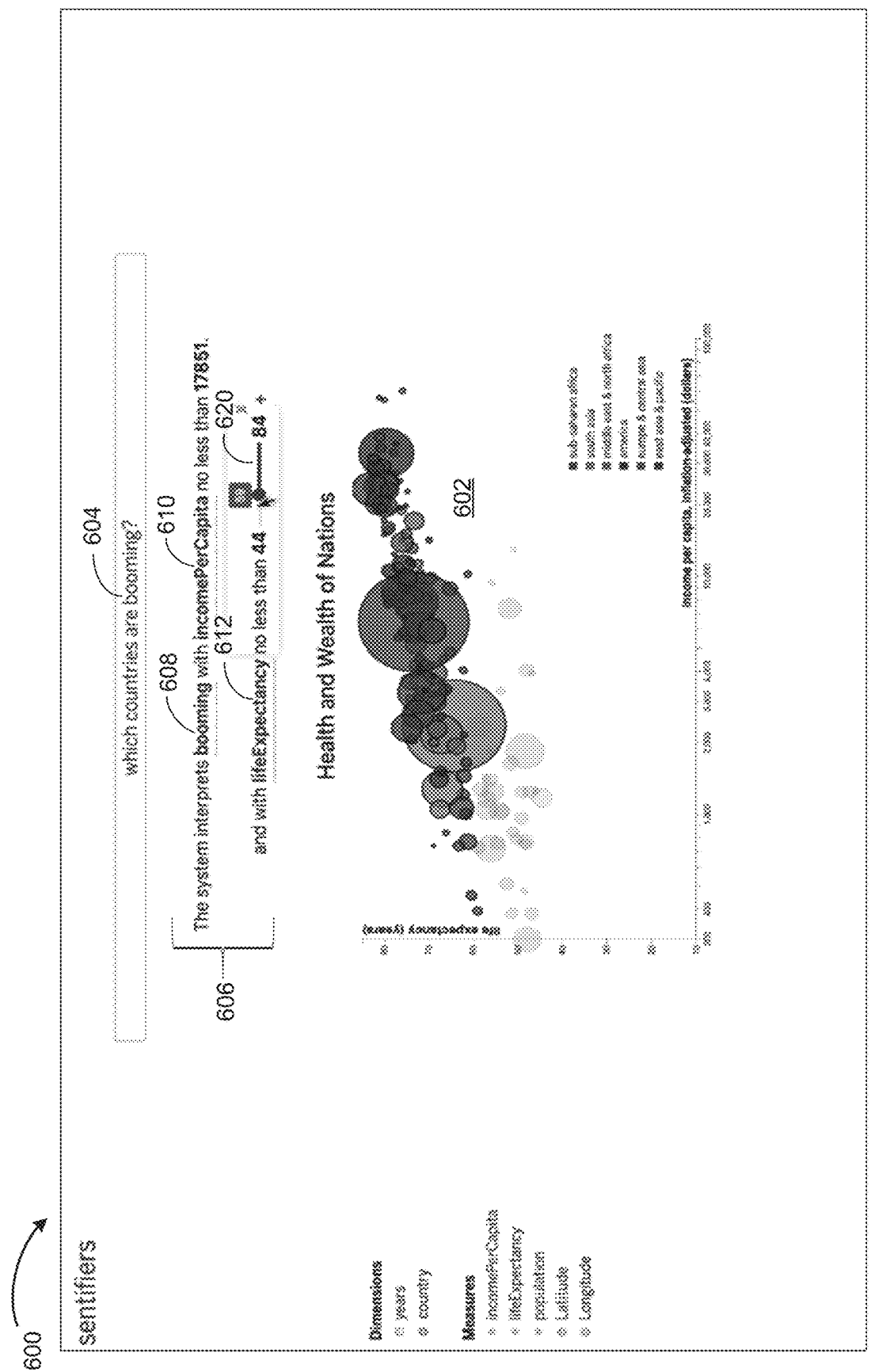
Figure 6E:
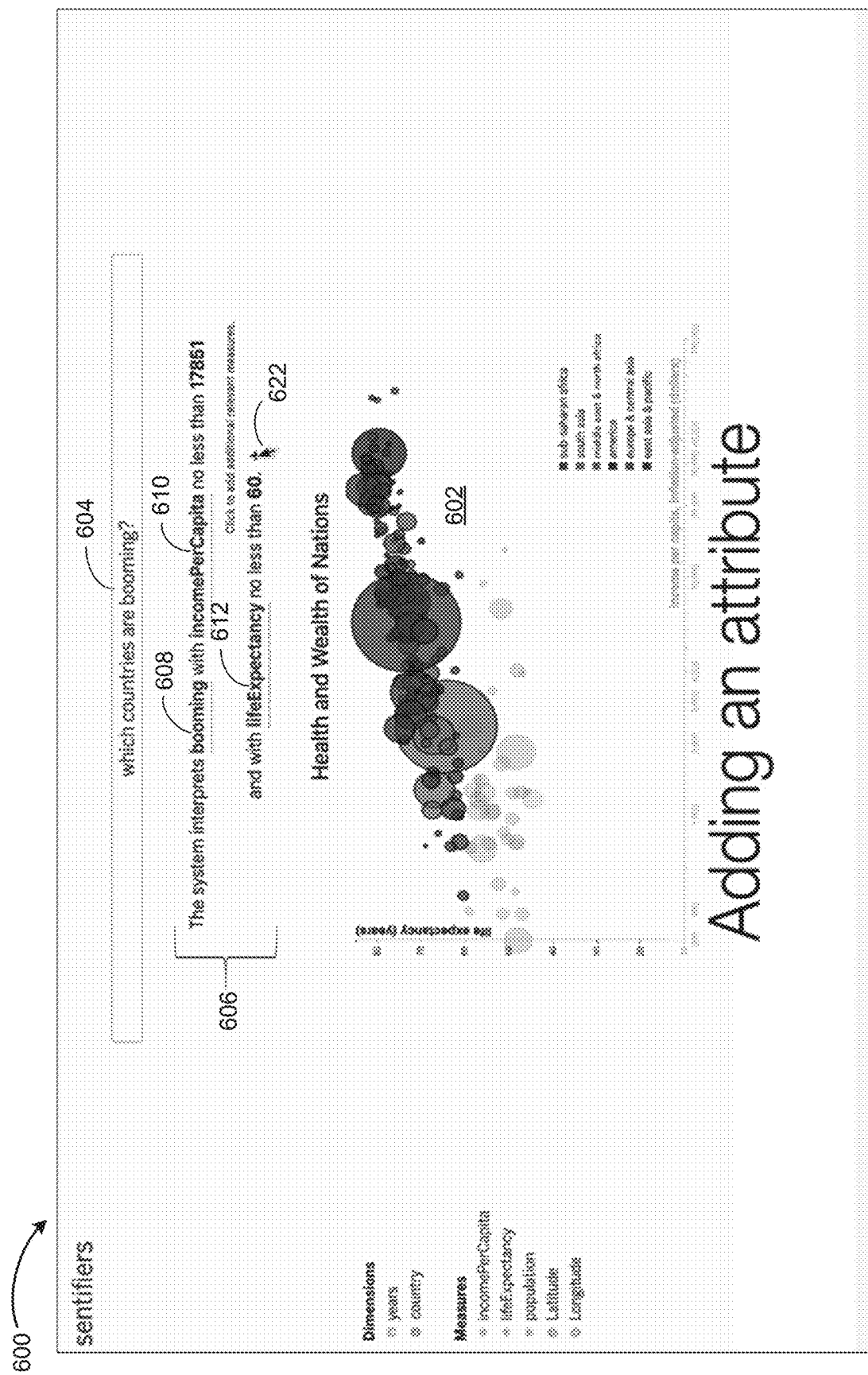
Figure 6F:
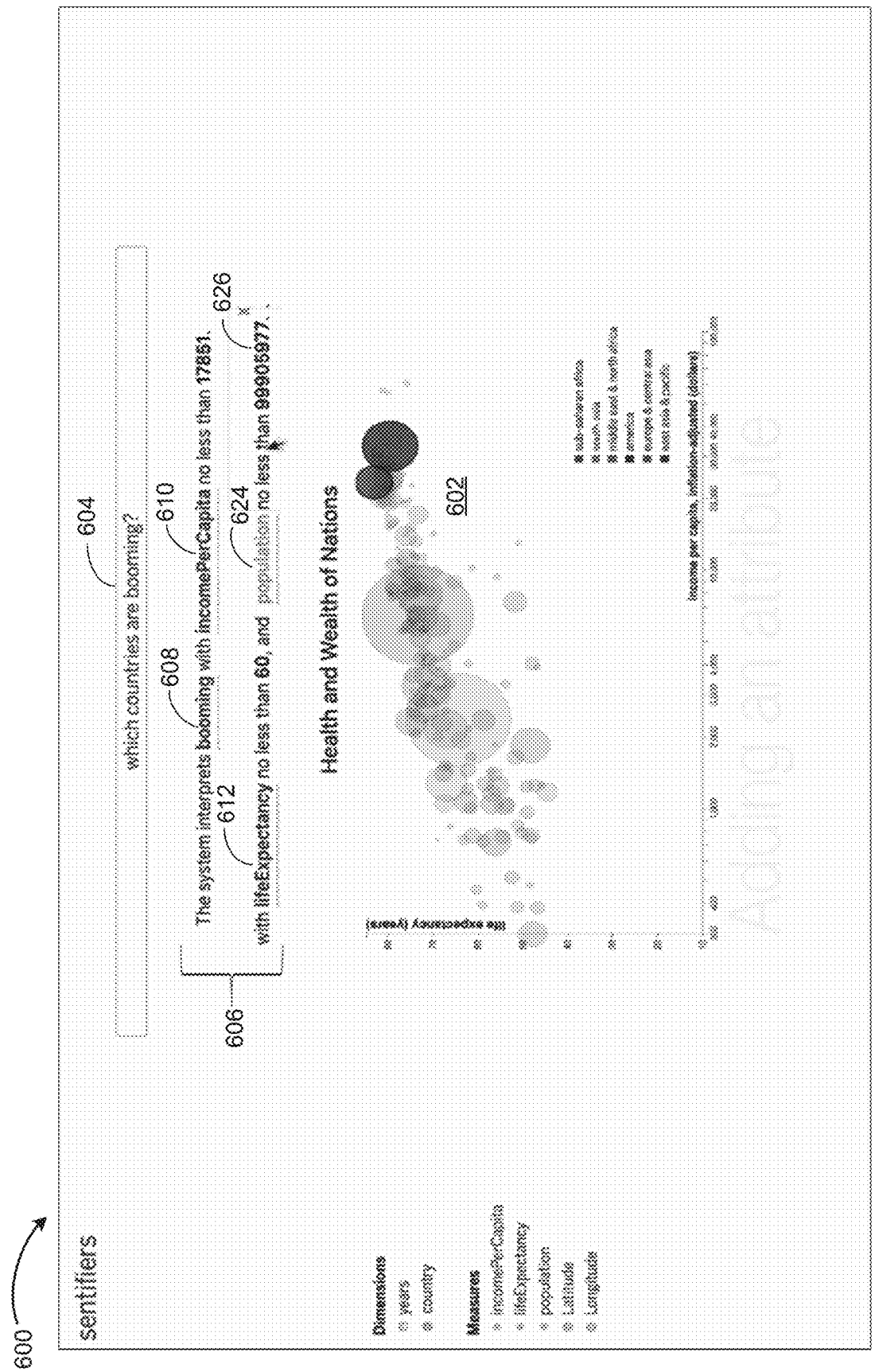

FIGS. 6A-6J provide examples of data visualizations in accordance with some implementations. FIG. 6A shows a graphical user interface 600 displaying a data visualization 602 of a dataset of health and wealth of nations, according to some implementations. A user starts interacting with the data visualization 602 by providing an input 604 that specifies "which countries are booming?" As indicated in a text response 606 in FIG. 6B, the system identifies the keyword "booming" 608 as a modifier, and its closest co-occurring numerical data fields "incomePerCapita" 610 and "Life Expectancy" 612. The system also identifies the keyword "booming," and the numerical data fields to have positive sentiments (indicated by similar color codes). Based on the positive correlation between the sentiment polarities, the system selects the Top N values (a numeric range) for the numerical data fields (shown by "no less than" ranges 614 and 616 for the data fields "incomePerCapita" and "Life Expectancy"). As shown in FIGS. 6C and 6D, some implementations show one or more refinement widgets, such as the slider affordance 618 in FIG. 6C and slider affordance 620 in FIG. 6D, for the user to further refine the numeric range of the data fields. When the user selects values (refine the range) for either of the numerical data fields, the system updates the data visualization 602. In some implementations, as shown in the example in FIG. 6E, the system also shows an affordance "+" 622 to allow the user to add attributes or measures (sometimes called data fields). When the user selects to add a data field name, the system responds with the next highest co-occurring data field named "population" 624 along with a numeric data range 626, as shown in FIG. 6F.

Figure 6G:
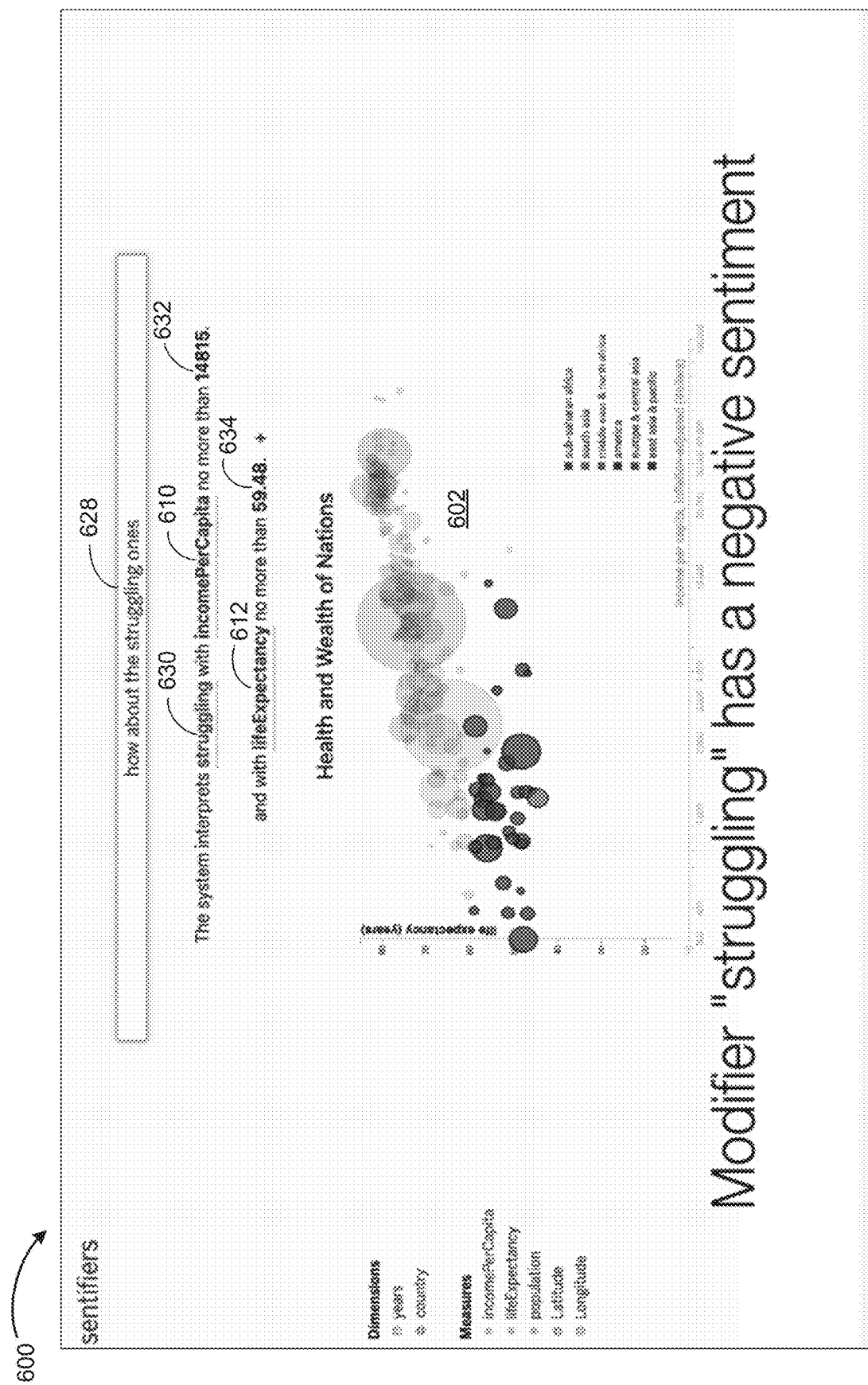
Figure 6H:
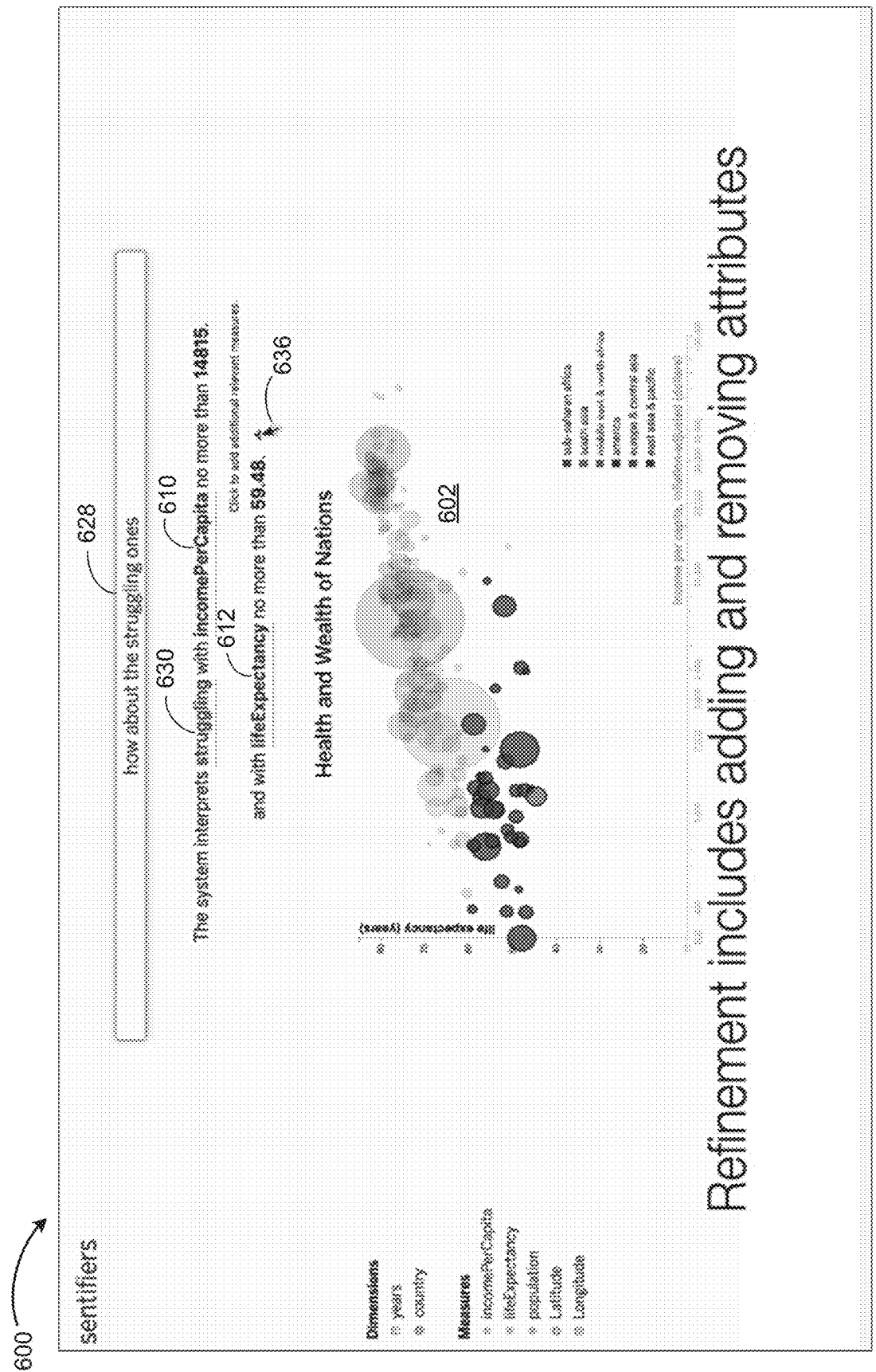
Figure 6I:
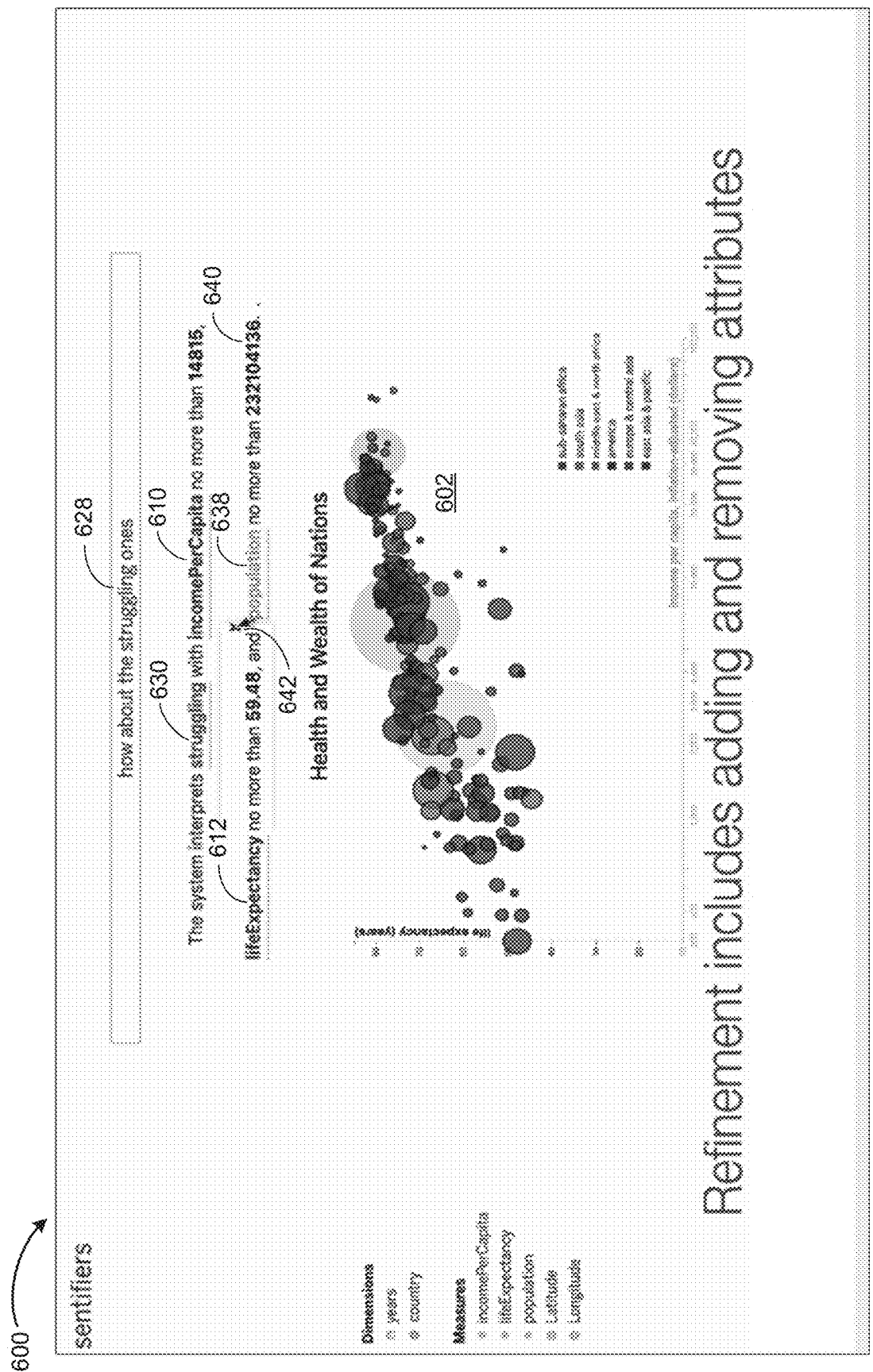
Figure 6J:
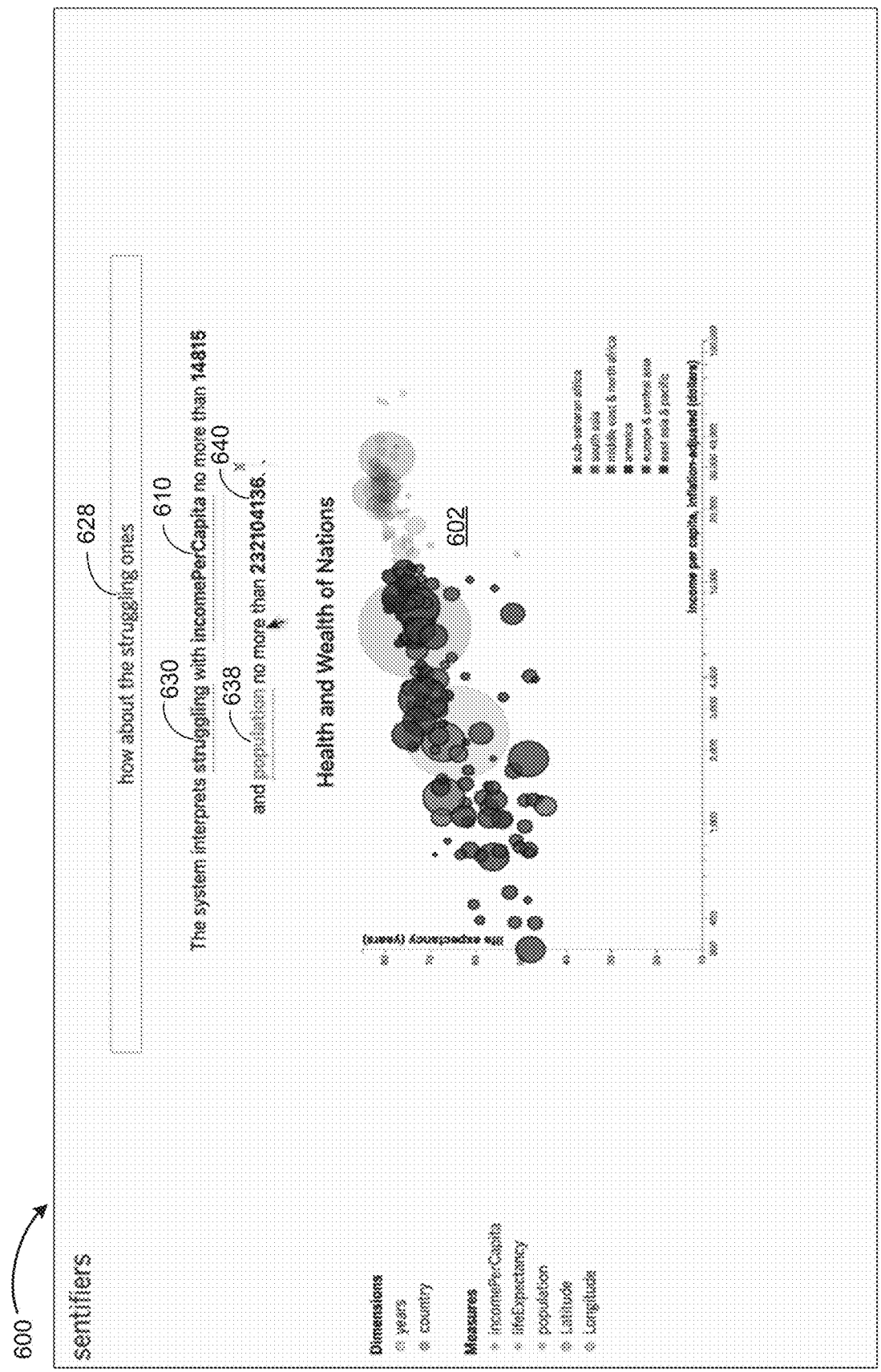

To continue the example, in the example shown in FIG. 6G, suppose the user types "how about the struggling ones" 628. The system identifies the modifier "struggling" 630, which has a negative sentiment polarity (indicated by the red color), the co-occurring data field "incomePerCapita" 610 that has a positive sentiment polarity (indicated by the blue color), and the co-occurring data field "lifeExpectancy" 612 that also has a positive sentiment polarity (also indicated by the blue color). The dissimilar sentiment polarities of the modifier and the data field names causes the system to select the Bottom N ranges 632 and 634 (as indicated by "no more than") for the respective data fields. The system also shows a "+" affordance 636 for the user to add a data field name, as shown in FIG. 6H. When the user selects the "+" affordance 636, the system responds by adding the data field name "population" 638, which is the next highest co-occurring data field name (with the keyword "struggling") along with a numeric range 640, as shown next in FIG. 6I. In some implementations, the system also shows an affordance "x" 642 to allow the user to remove attributes or measures (sometimes called data fields). When the user deselects or removes attributes, the system automatically updates the data visualization 602 by removing appropriate filters. In the example shown in FIG. 6J, the filter for the data field named "lifeExpectancy" has been removed.

In this way, some implementations show a graphical user interface for processing an input data field that accepts queries through keyboard input or a voice interface. Upon execution of the query, range filters for the co-occurring numerical attributes are applied, showing a visualization response, according to some implementations. In some implementations, the system interpretation is expressed in the form of interactive text above the visualization to help the user understand the provenance of how the modifier was interpreted. In some implementations, positive, negative, and neutral sentiments are shown in different colors (e.g., blue, red, and yellow, respectively). In some implementations, the text contains widgets that show data ranges for data fields, starting from the highest co-occurring one. Some implementations show system presumptions as widgets where the user can refine these defaults. In some implementations, these refinements are persistent for the duration of the user session. In some implementations, if domain-specific semantics are used, a link to the source is provided. In some implementations, given the limited real-estate and to provide easier readability, the system limits the display to two widgets by default; however, the user has the ability to delete or add additional widgets, and the interface updates to reflect the changes.

Figure 7:
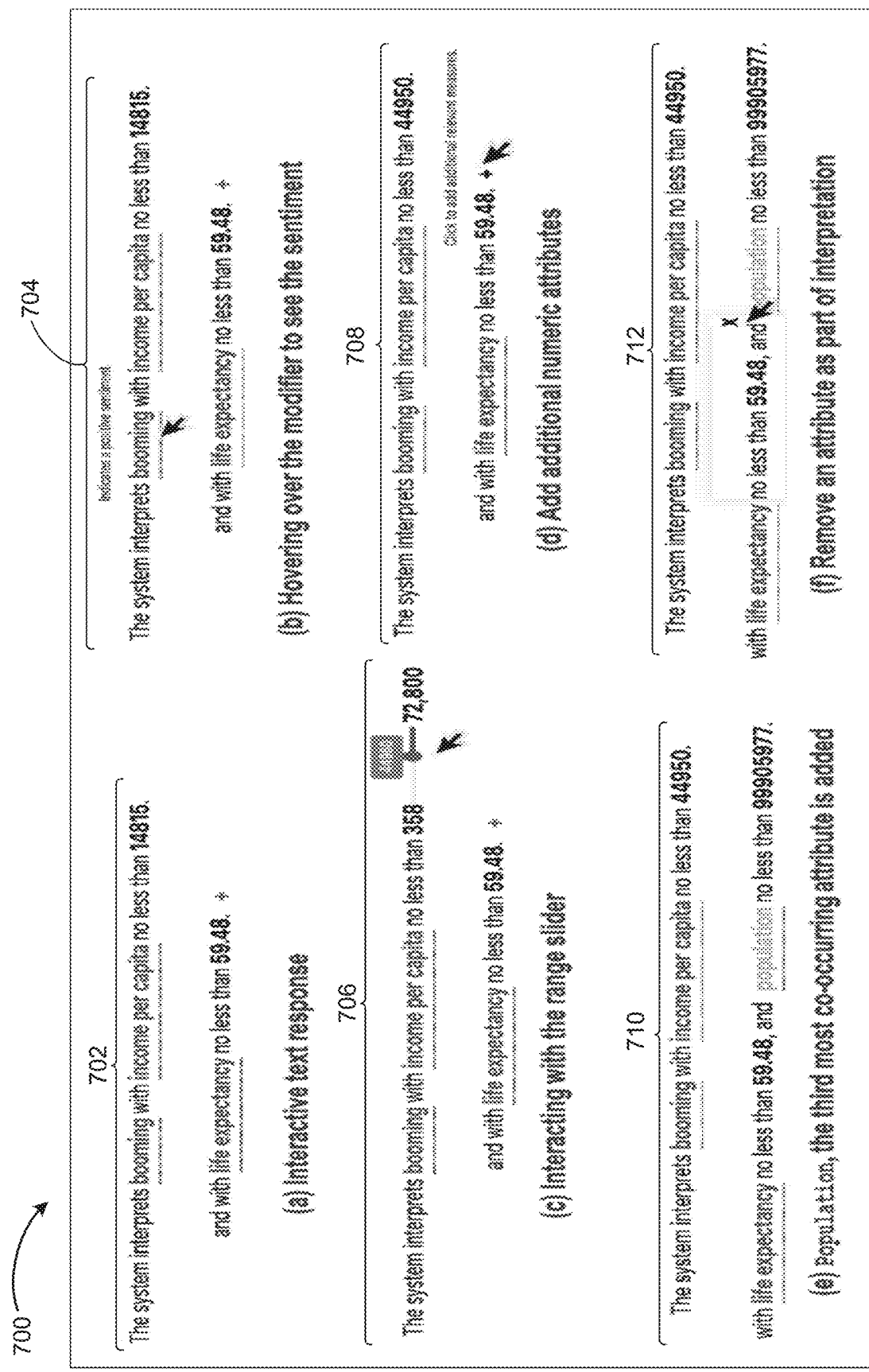
FIG. 7 shows an example text response in accordance with some implementations.

FIG. 7 show example text responses in accordance with some implementations. The example in 702 shows an interactive text response, according to some implementations. The example in 704 shows a capability that allows a user to hover (e.g., move a cursor) over a modifier to view a sentiment associated with a modifier, according to some implementations. The example in 706 shows a range slider for a user to interact with, according to some implementations. The example in 708 shows an affordance "+" for a user to add numerical data fields, according to some implementations. The example in 710 shows an update to the text response to show an additional data field, a third most occurring data field, after the user selects to add more data fields. The example in 712 shows an affordance "x" to remove a data field as part of an interpretation, according to some implementations.

FIGS. 8A-8J provide a flow diagram of a method 800 for generating (802) data visualizations according to some implementations. The method executes (804) at a computing device (e.g., the computing device 200) having a display (e.g., the display 212), one or more processors (e.g., the processors 202), and memory (e.g., the memory 206) storing (806) one or more programs configured for execution by the one or more processors. The computing device receives (808) a first user input to specify a natural language command directed to a data source. The natural language command includes a request for information about the data source. The computing device identifies (810) (e.g., using a part-of-speech (POS) tagger, as described above), in the natural language command, a first keyword that is a gradable adjective that modifies a second keyword in the natural language command.

The computing device also identifies (812) a numerical data field, from the data source, whose field name co-occurs with the first keyword in natural language utterances in a predefined stored corpus of natural language utterances, based on quantifying co-occurrence using a co-occurrence metric. Referring next to FIG. 8I, in some implementations, identifying the numerical data field includes selecting (832) a numerical data field from a plurality of numerical data fields for the data source based on analyzing co-occurrence between all n-gram combinations of the first keyword and field names of the plurality of numerical data fields, in natural language utterances. Referring next to FIG. 8J, in some implementations, identifying the numerical data field includes selecting (834) a first numerical data field from a plurality of numerical data fields for the data source when the first numerical data field has a field name with a non-zero Pointwise Mutual Information Measure (PMI) score indicating presence of a co-occurrence with the first keyword.

Figure 8A:
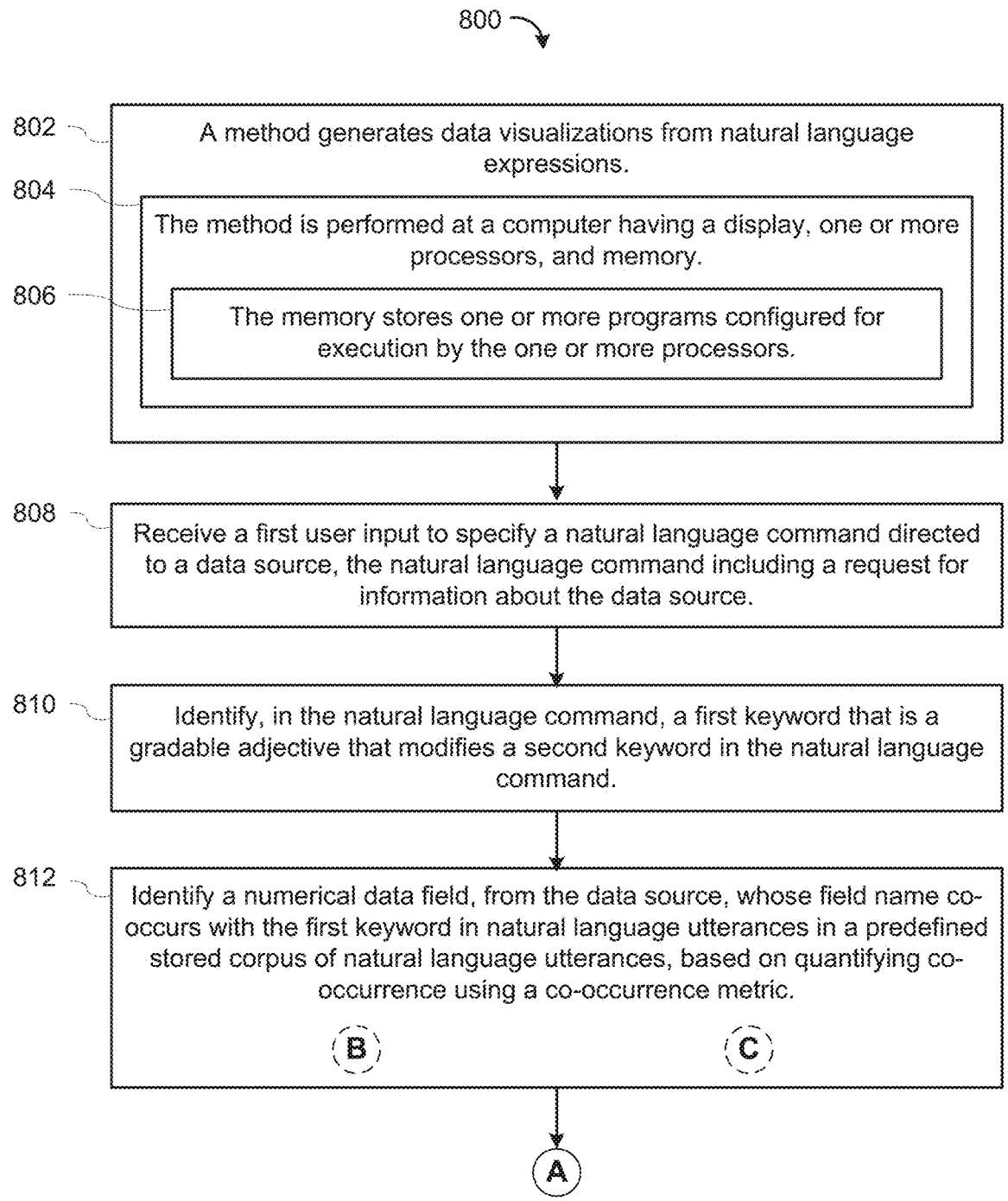
Figure 8B:
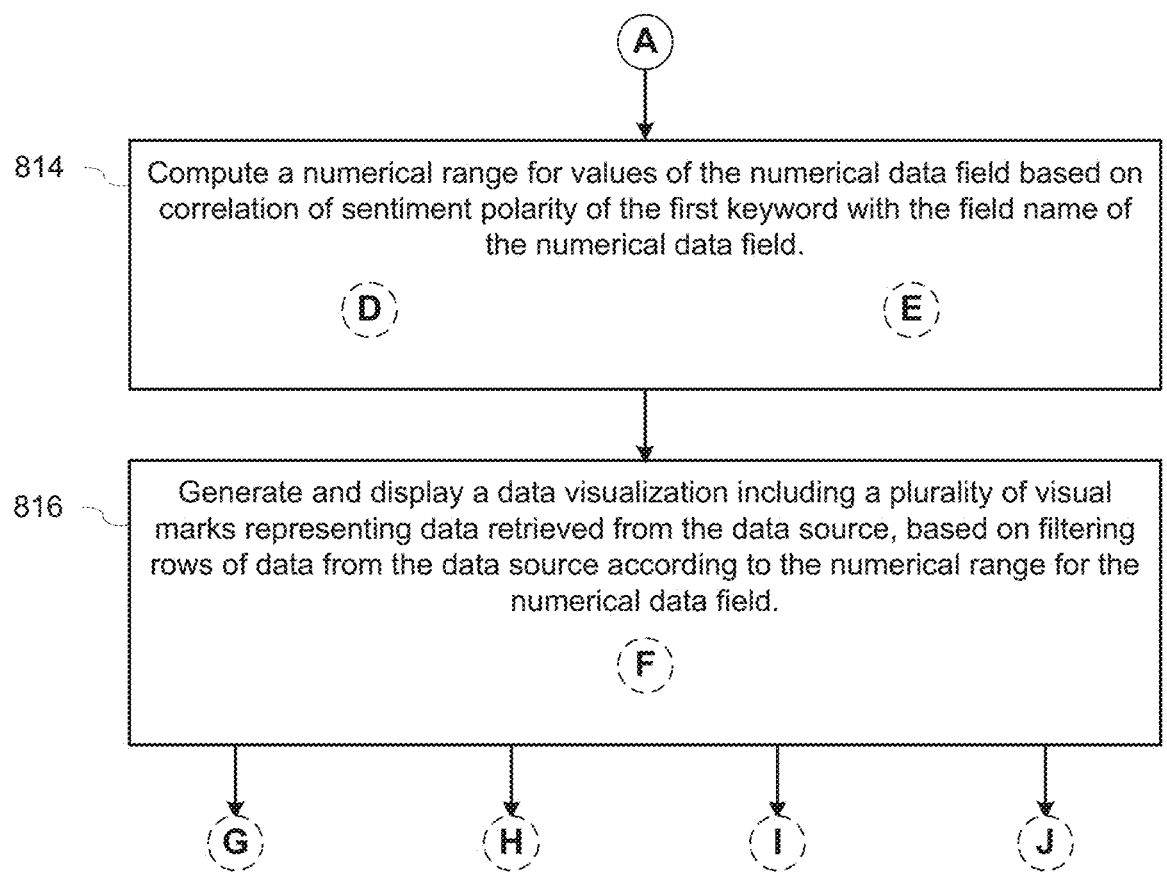

Referring next to FIG. 8B, the computing device computes (814) a numerical range for values of the numerical data field based on correlation of sentiment polarity of the first keyword and the field name of the numerical data field. Referring next to FIG. 8C, in some implementations, computing the numerical range for values of the numerical data field includes computing (818) (i) the Top N values of the numerical data field in the range [med+MAD,max], or (ii) the Bottom N values of the numerical data field in the range [min,abs(med-MAD)], where med, MAD, min, and max are the median, median absolute deviation, minimum, and maximum values of the numerical data field respectively. Referring next to FIG. 8D, in some implementations, computing the numerical range for values of the numerical data field includes: (i) when semantic polarity of the first keyword is positively correlated with semantic polarity of field name of a first numerical data field (i.e., the first keyword and the first numerical data field have similar sentiment polarities), computing (820) the Top N values for the first numerical data field; and (ii) when semantic polarity of the first keyword is negatively correlated with semantic polarity of the field name of the first numerical data field (i.e., the first keyword and the first numerical data field have divergent sentiment polarities), computing (822) the Bottom N values for the first numerical data field.

Figure 8K:
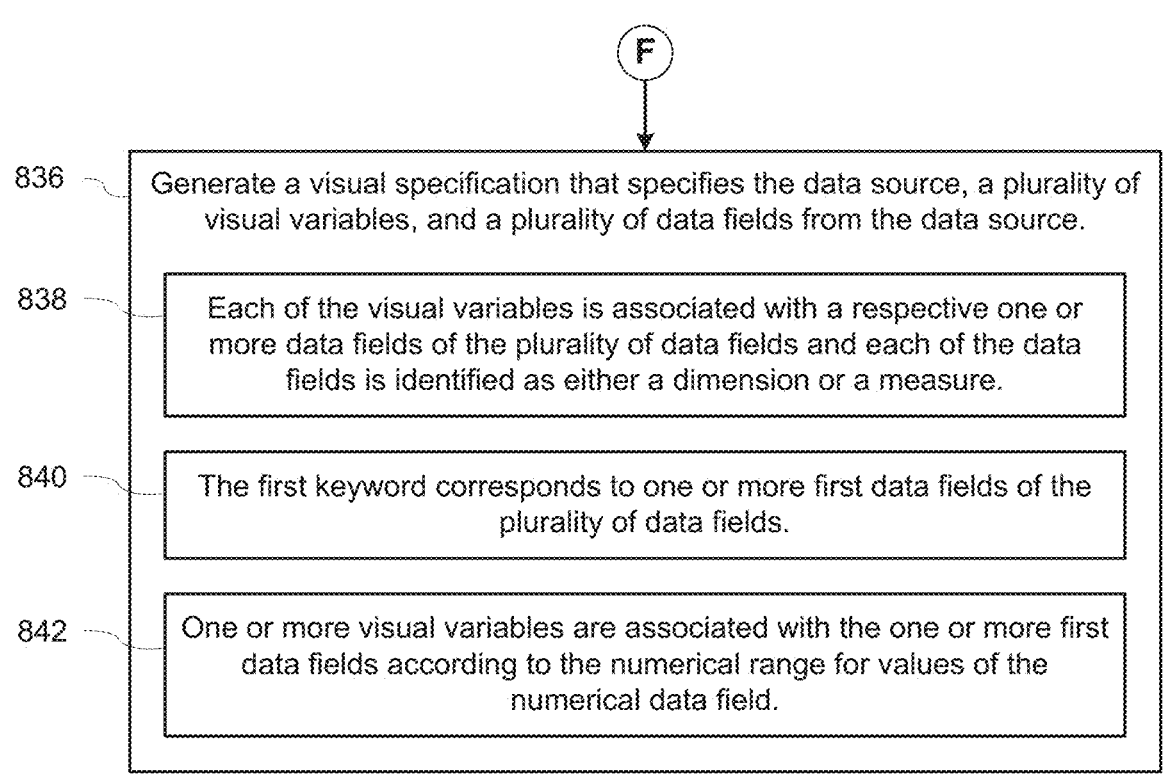

Referring back to FIG. 8B, the computing device also generates and displays (816) a data visualization including a plurality of visual marks representing data retrieved from the data source, based on filtering rows of data from the data source according to the numerical range for the numerical data field. Referring next to FIG. 8K, in some implementations, generating the data visualization includes generating (836) a visual specification that specifies the data source, a plurality of visual variables, and a plurality of data fields from the data source. Each of the visual variables is (838) associated with a respective one or more data fields of the plurality of data fields and each of the data fields is identified as either a dimension or a measure. The first keyword corresponds (840) to one or more first data fields of the plurality of data fields. One or more visual variables are associated (842) with the one or more first data fields according to the numerical range for values of the numerical data field.

Referring back to FIG. 8E, in some implementations, the computing device also determines (824) a default range for values of the numerical data field based on domain-specific information. In some implementations, if domain-specific semantics are used, a link to the source is provided. Referring next to FIG. 8F, in some implementations, the computing device also displays (826) interactive text to show a provenance of interpretation of the first keyword (as a numerical filter using the numerical range).

Referring next to FIG. 8G, in some implementations, the computing device also displays (828) one or more user interface widgets to show, repair, and/or refine the numerical range. In some implementations, widgets allow a user to modify default values for the numerical data field. In some implementations, widgets show the numerical range for values of the numerical data field. Some implementations show data ranges for attributes, starting from the highest co-occurring one. In some implementations, user refinements persist for duration of a user session. In some implementations, given the limited real-estate and to provide easier readability, the display is limited to two widgets by default. However, the user has the ability to delete or add additional widgets and the interface updates to reflect the changes Referring next to FIG. 8H, in some implementations, the computing device also displays (830) the sentiment polarities of the first keyword and the field name of the numerical data field using one or more color encodings (e.g., positive, negative, and neutral sentiments are shown in blue, red, and yellow, respectively).

Example Results from Use

In various experiments, participants were positive about the system and identified many benefits. Several participants were impressed with the ability of the system to understand their queries ("I typed scary to see what it would do, and it understood."). The system's text feedback was found to be helpful ("I wasn't sure how the system would handle this, but it was pretty clear when I saw the response"). The participants appreciated the functionality to be able to override or correct the system's response ("I wanted to tweak the range a bit and it was useful to be able to change the slider and see the result update at the same time").

The number of unique vague modifiers per participant ranged from 3 to 12 ($\mu=6.7$) with a total of 24 unique complex modifiers overall. The three most common modifiers were "good," "bad," and "severe" for the earthquakes dataset and "prosperous," "flourishing," and "poor" for the health and wealth of nations dataset. All participants interacted with the text response to understand the system behavior. The most common interaction was updating the data ranges for the attributes (69% of the interactions), followed by adding new attributes (23%), and deleting attributes from the interpreted result (8%). Comments relevant to this behavior included, "The range seemed high for me and I changed it. It was nice to see the system remember that," "I wanted population to be added to the mix and it was easy to just click and do that," and "I wasn't interested in life expectancy so I just got rid of it."

Additional Example Implementations

Some implementations support complex interpretations, such as combinations of vague modifiers in the same query. For example, some implementations interpret "show me countries that are doing very well and poorly." Some implementations provide flexibility in defining analytical functions such as associating "unsafe" with the frequency of recently occurring earthquakes with magnitude 5 are greater. Also, some implementations interpret queries such as "which countries are doing reasonably well." Some implementations provide middle range as opposed to the top ranges for the attributes, and/or provide widgets to adjust the ranges.

Some implementations handle customization and in-situ curation. In some implementations, the data field names are not curated up-front with human-readable words and phrases. In instances where data is messy with domain-specific terminology and abbreviations, the system allows users to customize semantics of attributes and interpretations in the flow of their analysis.

Some implementations handle system expectations, biases, and failures. Natural language algorithms have shown to exhibit socio-economic biases, including gender and racial assumptions often due to the nature of the training data. Their use can perpetuate and even amplify cultural stereotypes in natural language systems. Some implementations provide transparency in system behavior and/or use appropriate de-biasing methods.

In this way, the techniques described above can be used to interpret fuzzy and often subjective modifiers prevalent in natural language queries during visual analysis tasks. Using word co-occurrence and sentiment polarities, some implementations map these modifiers to more concrete analytical functions. Some implementations expose the provenance of the system's behavior as an interactive text response with the visualization. An evaluation of the system indicates that participants found the system to be intuitive and appreciated the ability to refine the system choices. Some implementations handle vagueness and the complexity in language in natural language tools to support data exploration.

Each of the above identified executable modules, applications, or sets of procedures may be stored in one or more of the identified memory devices, and corresponds to a set of instructions for performing a function described above. The modules or programs (i.e., sets of instructions) need not be implemented as separate software programs, procedures, or modules, and thus various subsets of these modules may be combined or otherwise re-arranged in various implementations. In some implementations, the memory 206 and/or the memory 264 stores a subset of the modules and data structures identified above. Furthermore, the memory 206 and/or the memory 264 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating data visualizations from natural language expressions, comprising:
at a computing device having a display, one or more processors, and memory storing one or more programs configured for execution by the one or more processors:
receiving, by the one or more processors via a visualization application executed on the computing device, a first user input on a graphical user interface to specify a natural language command directed to a data source, the natural language command including a request for information about the data source;
in response to the first user input:
identifying, in the natural language command, a first keyword that is a gradable adjective that modifies a second keyword in the natural language command;
identifying, by the one or more processors, a numerical data field, from the data source, wherein a field name of the identified numerical data field co-occurs with the first keyword in natural language utterances in a predefined stored corpus of the natural language utterances, based on quantifying co-occurrence using a co-occurrence metric to compute a score of the field name;
computing, by the one or more processors, a numerical range for values of the identified numerical data field based on correlation of sentiment polarity of the first keyword and sentiment polarity of the field name of the identified numerical data field, wherein the computing of the numerical range for values of the identified numerical data field comprises selecting a positive integer N and (i) computing Top N of values for the numerical data field when the sentiment polarity of the first keyword is positively correlated with the sentiment polarity of the field name of the numerical data field and (ii) computing Bottom N of values for the numerical data field when the sentiment polarity of the first keyword is negatively correlated with the sentiment polarity of the field name of the numerical data field; and
generating and displaying, on the graphical user interface, by the one or more processors via the visualization application, a data visualization including a plurality of visual marks representing data retrieved from the data source, based on filtering rows of data from the data source according to the computation of the numerical range for the values of the identified numerical data field.

2. The method of claim 1, wherein computing the numerical range for values of the numerical data field comprises:
computing (i) Top N of values of the numerical data field in a range [med+MAD, max] or (ii) Bottom N of values of the numerical data field in a range [min, abs(med−MAD)], where med, MAD, min, and max are respective median, median absolute deviation, minimum, and maximum values of the numerical data field.

3. The method of claim 1, further comprising:
determining a default range for values of the numerical data field based on domain-specific information.

4. The method of claim 1, further comprising:
displaying interactive text to show a provenance of interpretation of the first keyword.

5. The method of claim 1, further comprising:
displaying one or more user interface widgets to show, repair, and/or refine the numerical range.

6. The method of claim 1, further comprising:
displaying the sentiment polarities of the first keyword and the field name of the numerical data field using one or more color encodings.

7. The method of claim 1, wherein the co-occurrence metric measures co-occurrence between all n-gram combinations of the first keyword and field names of a plurality of numerical data fields from the data source.

8. The method of claim 1, wherein the co-occurrence metric computes a Pointwise Mutual Information Measure (PMI) score for each data field name of a respective numerical data field from the data source, measuring coupling of the respective data field name to the first keyword.

9. The method of claim 1, wherein generating the data visualization comprises:
generating a visual specification that specifies the data source, a plurality of visual variables, and a plurality of data fields from the data source, wherein:
each visual variable of the visual variables is associated with a respective one or more data fields of the plurality of data fields and each data field of the data fields is identified as either a dimension or a measure; and
the first keyword corresponds to one or more first data fields of the plurality of data fields; and
generating and displaying the data visualization according to the visual specification.

10. A computing device comprising:
one or more processors;
memory coupled to the one or more processors;
a display; and
one or more programs stored in the memory and configured for execution by the one or more processors, the one or more programs comprising instructions executed by the one or more processors for:
receiving, via a visualization application executed on the computing device, a first user input on a graphical user interface to specify a natural language command directed to a data source, the natural language command including a request for information about the data source;
in response to the first user input:
identifying, in the natural language command, a first keyword that is a gradable adjective that modifies a second keyword in the natural language command;
identifying a numerical data field, from the data source, wherein a field name of the identified numerical data field co-occurs with the first keyword in natural language utterances in a predefined stored corpus of natural language utterances, based on quantifying co-occurrence using a co-occurrence metric to compute a score of the field name;

computing a numerical range for values of the identified numerical data field based on correlation of sentiment polarity of the first keyword and sentiment polarity of the field name of the identified numerical data field, wherein the computing of the numerical range for values of the identified numerical data field comprises selecting a positive integer N and (i) computing Top N of values for the numerical data field when the sentiment polarity of the first keyword is positively correlated with the sentiment polarity of the field name of the numerical data field and (ii) computing Bottom N of values for the numerical data field when the sentiment polarity of the first keyword is negatively correlated with the sentiment polarity of the field name of the numerical data field; and generating and displaying, on the graphical user interface, a data visualization including a plurality of visual marks representing data retrieved from the data source, based on filtering rows of data from the data source according to the computing of the numerical range for the values of the identified numerical data field.

11. The computing device of claim 10, wherein computing the numerical range for values of the numerical data field comprises:

computing (i) Top N of values of the numerical data field to range from [med+MAD, max] or (ii) Bottom N of values of the numerical data field to range from [min, abs(med−MAD)], where med, MAD, min, and max are the respective median, median absolute deviation, minimum, and maximum values of the numerical data field.

12. The computing device of claim 10, further comprising:

displaying interactive text to show a provenance of interpretation of the first keyword.

13. The computing device of claim 10, further comprising:

displaying one or more user interface widgets to show, repair, and/or refine the numerical range.

14. The computing device of claim 10, further comprising:

displaying the sentiment polarities of the first keyword and the field name of the numerical data field using one or more color encodings.

15. The computing device of claim 10, wherein the co-occurrence metric measures co-occurrence between all n-gram combinations of the first keyword and field names of a plurality of numerical data fields from the data source.

16. The computing device of claim 10, wherein the co-occurrence metric computes a Pointwise Mutual Information Measure (PMI) score for each data field name of a respective numerical data field from the data source, measuring coupling of the respective data field name to the first keyword.

17. The computing device of claim 10, wherein generating the data visualization comprises:

generating a visual specification that specifies the data source, a plurality of visual variables, and a plurality of data fields from the data source, wherein:

each visual variable of the visual variables is associated with a respective one or more data fields of the plurality of data fields and each data field of the data fields is identified as either a dimension or a measure; and the first keyword corresponds to one or more first data fields of the plurality of data fields; and generating and displaying the data visualization according to the visual specification.

18. A non-transitory computer readable storage medium storing one or more programs, the one or more programs configured for execution by a computing device having one or more processors, memory, and a display, the one or more programs comprising instructions executed by the one or more processors for:

receiving, via a visualization application executed on the computing device, a first user input on a graphical user interface to specify a natural language command directed to a data source, the natural language command including a request for information about the data source;

in response to the first user input:

identifying, in the natural language command, a first keyword that is a gradable adjective that modifies a second keyword in the natural language command;

identifying a numerical data field, from the data source, wherein a field name of the identified numerical data field co-occurs with the first keyword in natural language utterances in a predefined stored corpus of natural language utterances, based on quantifying co-occurrence using a co-occurrence metric to compute a score of the field name;

computing a numerical range for values of the identified numerical data field based on correlation of sentiment polarity of the first keyword and sentiment polarity of the field name of the identified numerical data field, wherein the computing of the numerical range for values of the identified numerical data field comprises selecting a positive integer N and (i) computing Top N of values for the numerical data field when the sentiment polarity of the first keyword is positively correlated with the sentiment polarity of the field name of the numerical data field and (ii) computing Bottom N of values for the numerical data field when the sentiment polarity of the first keyword is negatively correlated with the sentiment polarity of the field name of the numerical data field; and generating and displaying, on the graphical user interface, a data visualization including a plurality of visual marks representing data retrieved from the data source, based on filtering rows of data from the data source according to the computing of the numerical range for the values of the identified numerical data field.

* * * * *